United States Patent
Gourlay et al.

(10) Patent No.: US 9,432,636 B2
(45) Date of Patent: Aug. 30, 2016

(54) LARGE-SCALE SURFACE RECONSTRUCTION THAT IS ROBUST AGAINST TRACKING AND MAPPING ERRORS

(71) Applicant: Microsoft Technology Licensing, LLC, Redmond, WA (US)

(72) Inventors: Michael Jason Gourlay, Seattle, WA (US); Justin Avram Clark, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 466 days.

(21) Appl. No.: 14/091,262

(22) Filed: Nov. 26, 2013

(65) Prior Publication Data
US 2015/0145985 A1    May 28, 2015

(51) Int. Cl.
*G06T 7/00* (2006.01)
*H04N 7/18* (2006.01)
*G06T 17/00* (2006.01)
*G06T 7/20* (2006.01)

(52) U.S. Cl.
CPC .............. *H04N 7/183* (2013.01); *G06T 7/0028* (2013.01); *G06T 7/2033* (2013.01); *G06T 17/00* (2013.01); *G06T 2200/08* (2013.01); *G06T 2207/10016* (2013.01); *G06T 2207/10028* (2013.01); *G06T 2207/20072* (2013.01); *G06T 2207/30244* (2013.01)

(58) Field of Classification Search
CPC .................................................... G06T 7/0051
USPC ........................................................ 348/135
See application file for complete search history.

(56) References Cited

U.S. PATENT DOCUMENTS

| | | | |
|---|---|---|---|
| 4,710,876 A | 12/1987 | Cline et al. | |
| 6,711,293 B1 | 3/2004 | Lowe | |
| 2012/0194644 A1* | 8/2012 | Newcombe | G06T 7/20 348/46 |
| 2014/0072212 A1* | 3/2014 | Sorgi | G06T 7/0081 382/164 |

OTHER PUBLICATIONS

Newcombe, Richard A., et al., "KinectFusion: Real-Time Dense Surface Mapping and Tracking," IEEE International Symposium on Mixed and Augmented Reality, Science and Technology Proceedings, Oct. 26-29, 2011, 10 pages.

Klein, Georg, et al., "Parallel Tracking and Mapping on a Camera Phone," IEEE 8th International Symposium on Mixed and Augmented Reality, Oct. 19, 2009, 4 pages.

(Continued)

*Primary Examiner* — Yulin Sun
(74) *Attorney, Agent, or Firm* — Dan Choi; Judy Yee; Micky Minhas

(57) ABSTRACT

Depth maps of a physical space are obtained using a depth sensor carried by a rig such as a robot or a head mounted display device worn by a user. Visible light images are also obtained. The images and orientation readings are used to create a pose graph which includes nodes connected by links. The nodes are associated with different poses of the rig and the corresponding images. Links between the nodes represent correspondences between the images, and transforms between coordinate systems of the nodes. As new images are captured, the pose graph is updated to reduce an accumulation of errors. Furthermore, surfaces in the physical space can be reconstructed at any time according to the current state of the pose graph. Volumes used in a surface reconstruction process are anchored to the nodes such that the positions of the volumes are adjusted as the pose graph is updated.

20 Claims, 21 Drawing Sheets

(56) References Cited

OTHER PUBLICATIONS

Calakli, Fatih, et al., "High Resolution Surface Reconstruction from Multi-view Aerial Imagery," 2012 Second International Conference on 3D Imaging, Modeling, Processing, Visualization and Transmission, Jun. 20, 2011, 8 pages.
Whelan, Thomas, et al., "Kintinous: Spatially Extended KinectFusion," Computer Science and Artificial Intelligence Laboratory Technical Report, Jul. 19, 2012, 10 pages.
Lim, Jongwoo, et al., "Online Enviroment Mapping," IEEE Conference on Computer Vision and Pattern Recognition, Jun. 20, 2011, 8 pages.
Kim, Sehwan, et al., "Relocalization Using Virtual Keyframes for Online Environment Map Construction," 16th ACM Symposium on Virtual Reality Software and Technology, Nov. 18, 2009, 8 pages.
Strasdat, Hauke, et al., "Scale Drift-Aware Large Scale Monocular SLAM, Proceedings of Robotics: Science and Systems," Jun. 27, 2010, 8 pages.
Paalanen, Pekka, et al., "Towards Monocular On-Line 3D Reconstruction," ECCV Workshops on Vision in Action: Efficient Strategies for Cognitive Agents in Complex Environments, Oct. 12, 2008, 6 pages.
"Pose Graph Optimization," Part II: a case study, [censi.mit.edu/pub/research/2013-mole2d-slides.pdf], Mar. 2013, 24 pages.
Bylow, Erik, et al., "Real-Time Camera Tracking and 3D Reconstruction Using Signed Distance Functions," Proceedings of Robotics: Science and Systems, Jun. 2013, 8 pages.
Chen, Jiawen, et al., "Scalable Real-time Volumetric Surface Reconstruction," ACM Transactions on Graphics (TOG)—Siggraph 2013 Conference Proceedings, vol. 32, Issue 4, Jul. 2013, 10 pages.
Estrada, Carlos, et al., "Hierarchical Slam: real-time accurate mapping of large environments," IEEE Transactions on Robotics, vol. 21, Issue 4, Aug. 2005, 9 pages.
Salman, Nader, et al., "Surface Reconstruction from Multi-View Stereo of Large-Scale Outdoor Scenes," The International Journal of Virtual Reality, Jul. 2010, 9 pages.
Zhang, Jiakai, et al., "3D Reconstruction: Real-time 3D reconstruction in-door scene using moving Kinect," New York University, Jul. 2012, 34 pages.
Kaess, Michael, et al., "iSAM: Incremental Smoothing and Mapping," IEEE Transactions on Robotics, Manuscript, Sep. 7, 2008, 14 pages.
Hoppe, Hugues, et al., "Surface Reconstruction from Unorganized Points," ASIGGRAPH '92 Proceedings of the 19th annual conference on Computer graphics and interactive techniques, Jul. 1992, 8 pages.
Khoshelham, Kourosh, et al., "Accuracy and Resolution of Kinect Depth Data for Indoor Mapping Applications," Sensors 2012, Feb. 2012, 18 pages.
Stachniss, Cyrill, Robot Mapping: Graph-Based Slam with Landmarks, [ais.informatik.uni-freiburg.de/teaching/ws12/. . ./slam17-ls-landmarks.pdf], Jan. 2013, 6 pages.
Grisetti, Giorgio, et al., "A Tutorial on Graph-Based SLAM," IEEE Intelligent Transportation Systems Magazine, vol. 2, Issue 4, Winter 2010, 11 pages.
Stachniss, Cyrill, et al., "Pose Graph Compression for Laser-Based SLAM," Proceedings of the International Symposium of Robotics Research (ISRR). Sep. 2011, 16 pages.
"Second Written Opinion Issued in PCT Application No. PCT/US2014/066485", Mailed Date: Nov. 17, 2015, 7 Pages.
Lu, et al., "Globally Consistent Range Scan Alignment for Environment Mapping", In Journal of Autonomous Robots, Vol. 4, Issue 4, Oct. 1, 1997, pp. 333-349.
"International Preliminary Report on Patentability Issued in PCT Application No. PCT/US2014/066485", Mailed Date Feb. 24, 2016, 9 Pages.
"International Search Report & Written Opinion Received for PCT Patent Application No. PCT/US2014/066485", Mailed Date: Apr. 30, 2015, 11 Pages.
Sibley, et al., "Vast-scale Outdoor Navigation Using Adaptive Relative Bundle Adjustment", In the International Journal of Robotics Research, vol. 29, Issue 8, Jul. 1, 2010, 24 Pages.
Johannson, et al., "Temporally Scalable Visual SLAM using a Reduced Pose Graph", In Proceedings of the IEEE International Conference on Robotics and Automation, May 6, 2013, 8 Pages.
Kerl, et al., "Dense Visual SLAM for RGB-D Cameras", In Proceedings of the IEEE/RSJ International Conference on Intelligent Robots and Systems, Nov. 3, 2013, 7 Pages.
Henry, et al., "Create alert RGB-D Mapping: Using Depth Cameras for Dense 3D Modeling of Indoor Environments", In Proceedings of the 12th International Symposium on Experimental Robotics, Dec. 2010, 15 Pages.
PCT Demand and Article 34 Amendment dated Aug. 13, 2015, International Application No. PCT/US2014/066485.

* cited by examiner

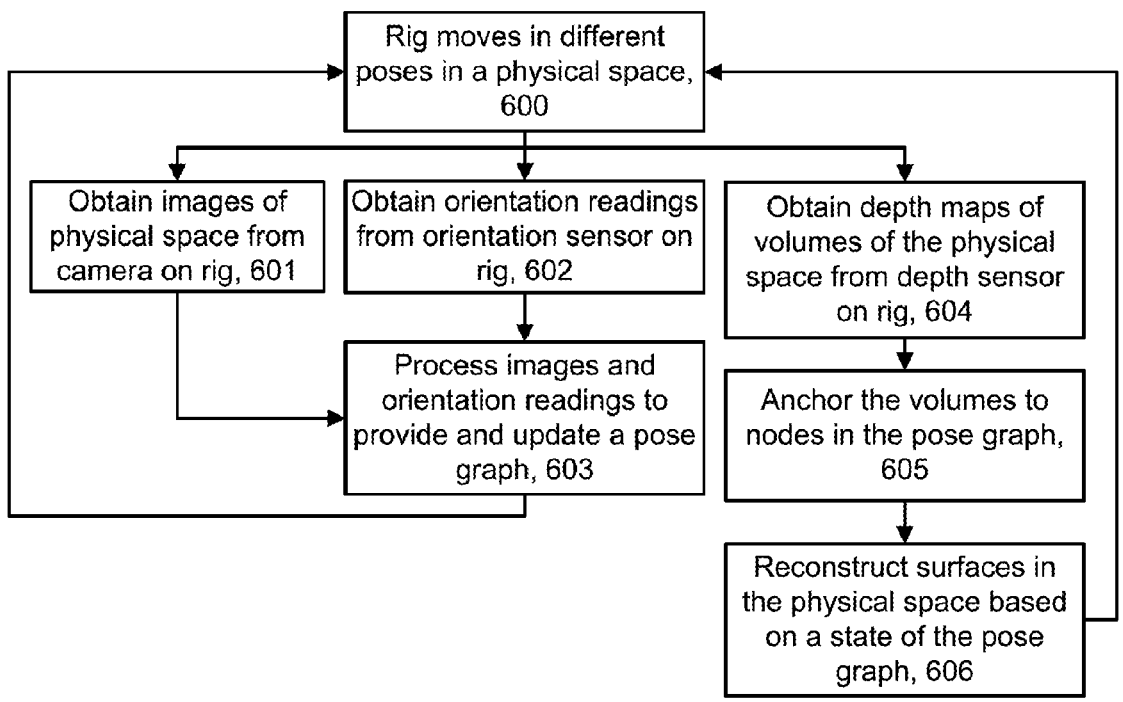
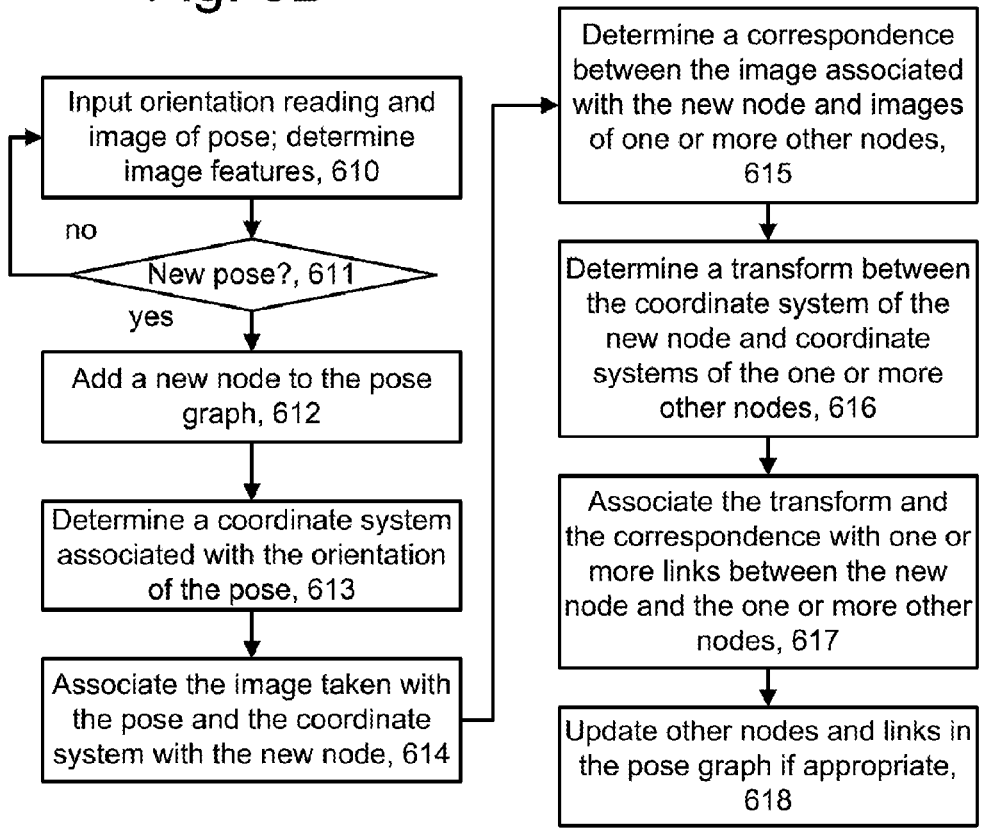

Camera image: Image1
Orientation reading: OR1

Depth map: DM1
Orientation reading: OR1

Pose graph

Node id: N1
Camera Image: Image1
Coordinate system: CS1

Link id: L(N1,N2)
Image correspondence: C(N1,N2)
Transform between coordinate systems: T(N1,N2)

Link id: L(N1,N3)
Image correspondence: C(N1,N3)
Transform between coordinate systems: T(N1,N3)

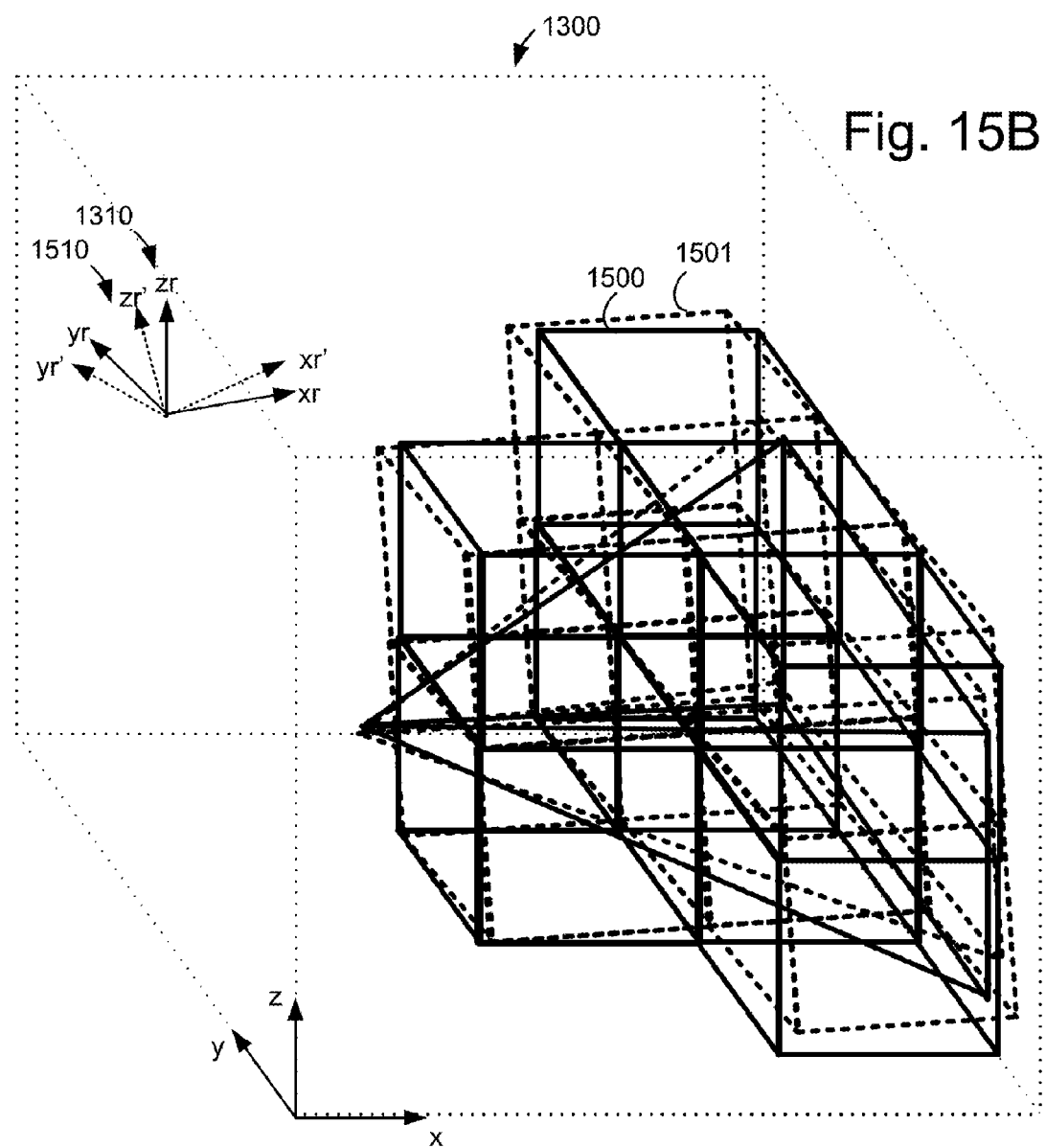

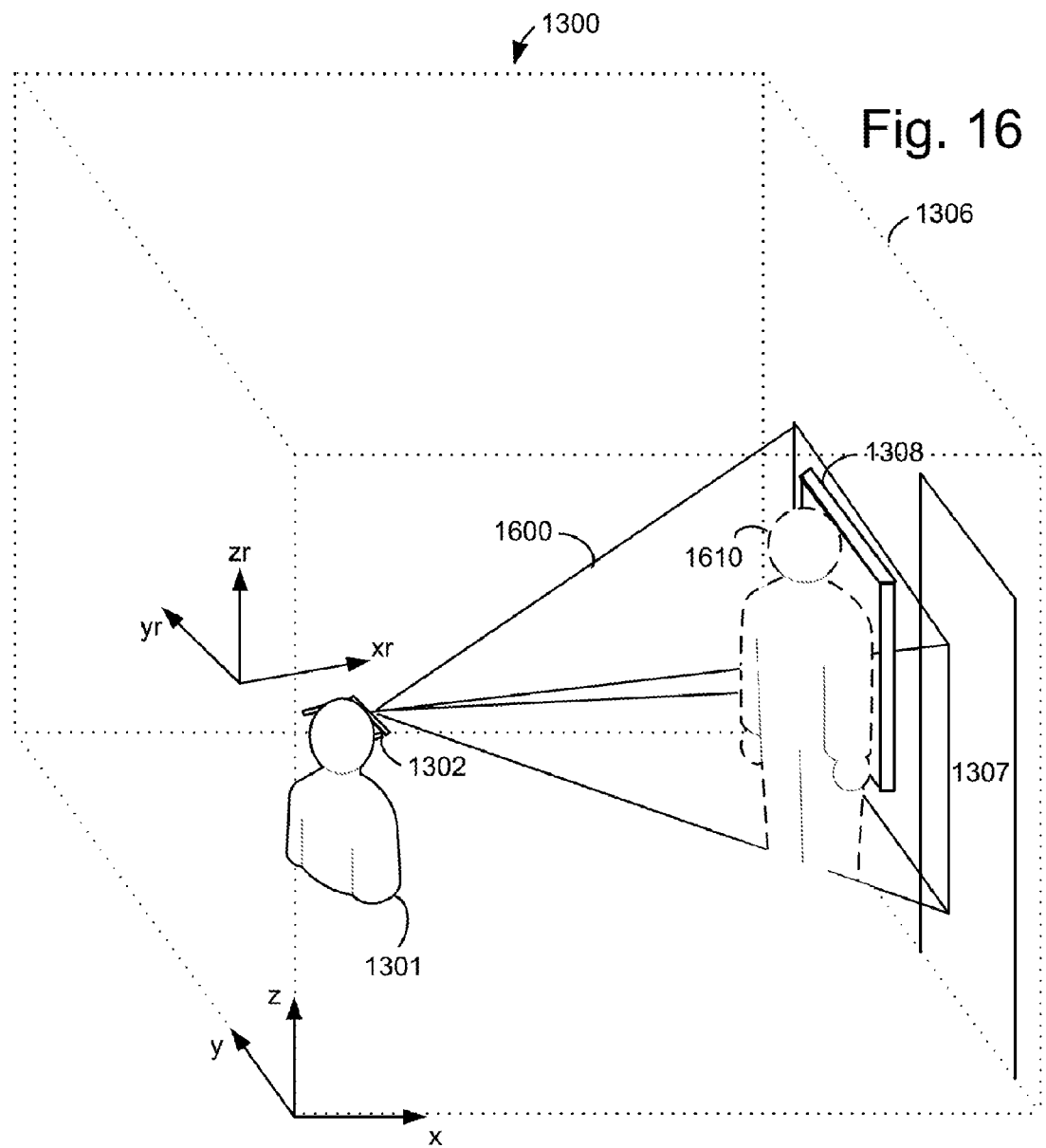

LARGE-SCALE SURFACE RECONSTRUCTION THAT IS ROBUST AGAINST TRACKING AND MAPPING ERRORS

BACKGROUND

Surface reconstruction (SR) involves identifying surfaces of objects in a physical space. For example, the surfaces can represents walls, floors, a ceiling, furniture or other objects in a room. The surfaces provide a model of the physical environment. Such a model can be used in a wide range of applications. One example is guiding a robot through a physical space. Another example is displaying a virtual object to a user, such by using a head mounted display device.

SUMMARY

Technology described herein provides various embodiments for reconstructing surfaces in a physical space.

Depth maps of a physical space are obtained using a depth sensor. A depth map contains depth values which represent a distance from the depth sensor to surfaces in a physical space. The depth maps are defined with respect to volumes in the physical space, and the location of the volumes is defined with respect to a coordinate system. For example, the coordinate system can be defined according to a pose (e.g., position and orientation) of a rig on which the depth sensor is carried.

However, errors in the position of the volumes can accumulate as additional depth maps are obtained and additional volumes are defined. To reduce the accumulation of errors, visible light images of the physical space are obtained and used to form a pose graph. The pose graph comprises nodes which are associated with different poses of the rig and the corresponding images. Links between the nodes represent correspondences between the images, and transforms between coordinate systems of the nodes. From time to time, as new images are captured, the pose graph is updated. For example, a node can be updated by updating the coordinate system associated with the node.

By anchoring the volumes to the nodes of the pose graph, the surface reconstruction process benefits from the increased accuracy which results from updating of the coordinate systems. As a result, the volumes and surfaces can be placed more accurately. Surfaces can be reconstructed at any time according to the current state of the pose graph.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In the drawings, like-numbered elements correspond to one another.

FIG. 6A depicts a process for reconstructing surfaces in a physical space using a pose graph.

FIG. 6B depicts further details of step 603 of FIG. 6A.

FIG. 15B depicts an adjusted placement of the volumes of FIG. 15A.

FIG. 16 depicts an example application in which a virtual object is placed in the physical space of FIG. 13A.

DETAILED DESCRIPTION

Surface reconstruction can be used in many applications, including placing a virtual object, defining a play space, path-finding, collision detection or occlusion of virtual objects a physical space.

Surface reconstruction over large scales requires robustness against tracking and mapping errors. For example, a physical space having a large scale can be a room in a home, office or museum, or an outdoor space. In a surface reconstruction process, surfaces are acquired using multiple depth maps which are acquired by a depth sensor carried on a rig. The surfaces are localized with respect to each other using computer vision tracking and mapping techniques which are prone to cumulative inaccuracies. Furthermore, pose estimates of the rig change over time as more information about the environment becomes available.

Some SR solutions operate on a small scale or ignore tracking errors. However, this results in SR data that is not self-consistent. The techniques provided herein address the above and other issues. In one approach, an SR process involves creating multiple separate SR volumes to reconstruct. Each volume is anchored to (e.g., associated with) a node (e.g., a key frame) in a tracking and mapping pose graph. When the pose graph updates, such as due to a bundle adjustment or a re-localization, the volumes automatically adjust their pose accordingly.

Additional aspects include allowing the volumes to overlap somewhat when they are initially placed, to avoid gaps which might otherwise occur when the position of the volumes is adjusted based on an update to the pose graph. New volumes can be created, or existing volumes can be expanded in size, to remove any gaps in the coverage of the physical space which may occur. Moreover, when SR volumes overlap excessively, redundant volumes can be deleted. Volumes can be occasionally re-anchored to a closest node if appropriate.

FIGS. 1-5 describe various systems which can be used for surface reconstruction. FIG. 6 and later figures describe surface reconstruction techniques and scenarios.

Figure 1:
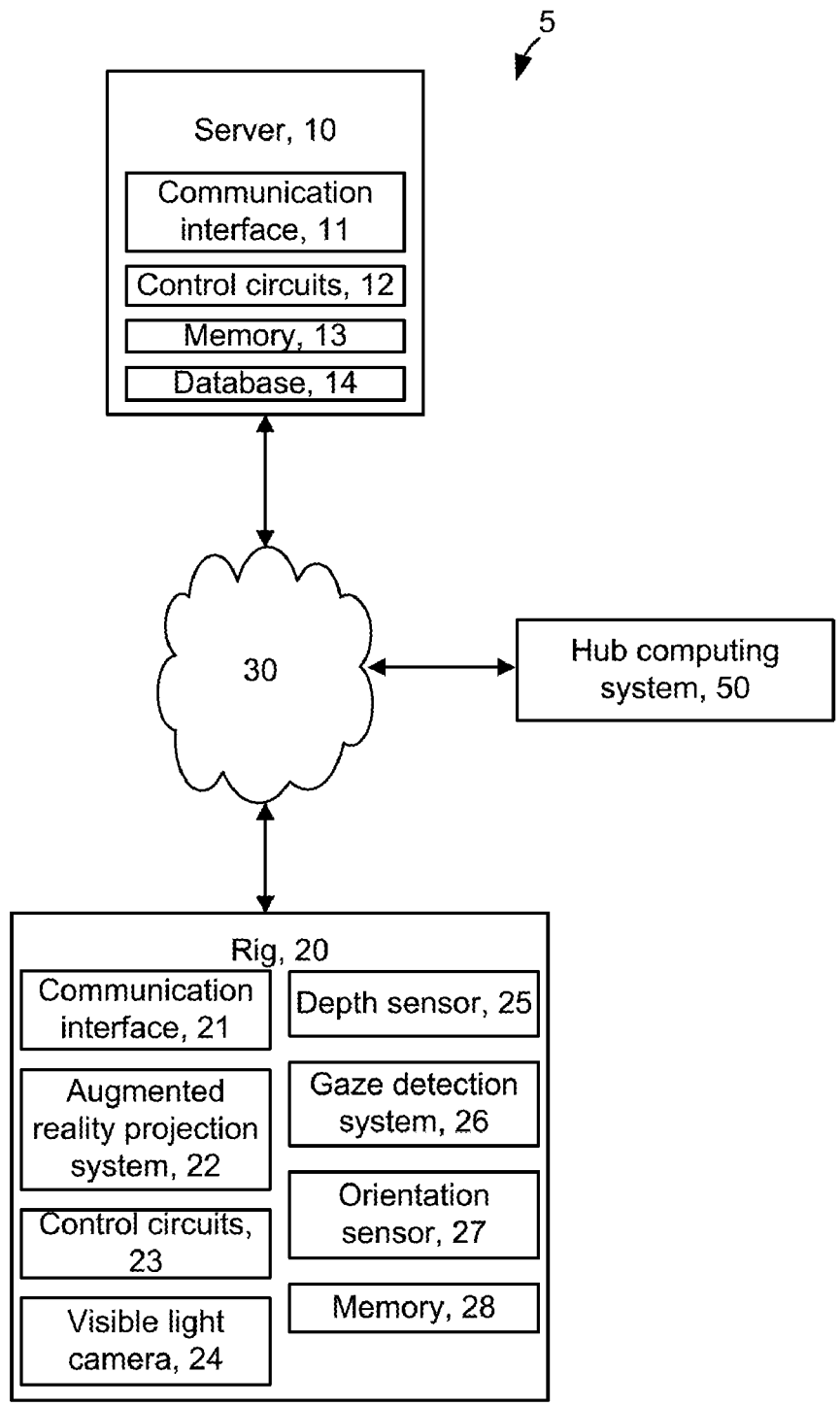
FIG. 1 is a block diagram of a system 5 for surface reconstruction which includes a rig, a server and a hub computing system.

FIG. 1 is a block diagram of a system 5 for surface reconstruction which includes a rig, a server and a hub computing system. The rig, server and hub computing system are examples of hardware computing devices. A rig 20 can represent a device which moves around in a physical space. The device may be mounted to an autonomous mobile robot, for instance, or carried or worn by a user, e.g., a person, such as on a head mounted display device, for instance. The rig has different poses as it moves around. In the context of tracking and mapping algorithms, a pose indicates a point in space and a direction. That is, it is a combination of a position and an orientation. The rig includes a communication interface 21, such as for communicating with a server 10 via a network 30. An augmented reality projection system 22 can be used for displaying augmented reality images (e.g., virtual objects) in the physical space in which surface reconstruction is performed. Control circuits 23 are used for controlling the various components of the rig. A visible light camera 24 obtains images of the physical space, e.g., at a fixed rate such as several times per second, or at specified times.

A depth sensor 25 obtains a depth map of the physical space. Typically, the depth maps are obtained less frequently than the camera images. The depth sensor can be a time-of-flight camera or a stereoscopic camera, for instance. A gaze detection system 26 may be used to determine the user's gaze in the case of the rig being a head mounted display device. For example, this can be useful in placing virtual objects in the physical space. An orientation sensor 27 obtains readings regarding an orientation of the rig. For, example, an orientation reading can be associated with each image and depth map. These can be inertial sensors, for instance, discussed further below. A memory 28 can store executable code which is executed by the control circuits to provide the functionality described herein, as well as storing information which is obtained by the visible light camera 24, the depth sensor 25, the gaze detection system 26 and the orientation sensor 27.

Optionally, the rig communicates with a server 10. For example, the rig could upload some of the information that it gathers or download information such as executable code, data for the augmented reality projection system, or other content. In one approach, the server is remote from the rig. In another approach, the rig communicates with a local hub computing system 50, such as in the user's home. The hub computing system could be a gaming console which runs various gaming and non-gaming applications, for instance. See also FIG. 5.

In one approach, the network 30 is a wireless network such as WI-FI®, BLUETOOTH®, infra-red (e.g., IrDA®) or cellular (e.g., GSM). Optionally, multiple rigs can communicate with one another within a common physical space.

Further details of these system are provided in connection with the following figures.

Generally, the communication interfaces allow communication between computing devices. The control circuits provide control of hardware and/or software of the respective computing devices. For example, the control circuits can include one or more processors which execute instructions stored on one or more tangible, non-transitory processor-readable storage devices having processor-readable software embodied thereon for programming a processor to perform processor- or computer-implemented methods as described herein. The memories can store the instructions as code, and can provide the processor-readable storage devices. The memories can provide databases, data stores or other sources of data which are accessed to perform the techniques described herein. The memories can be hardware memory devices.

Figure 2:
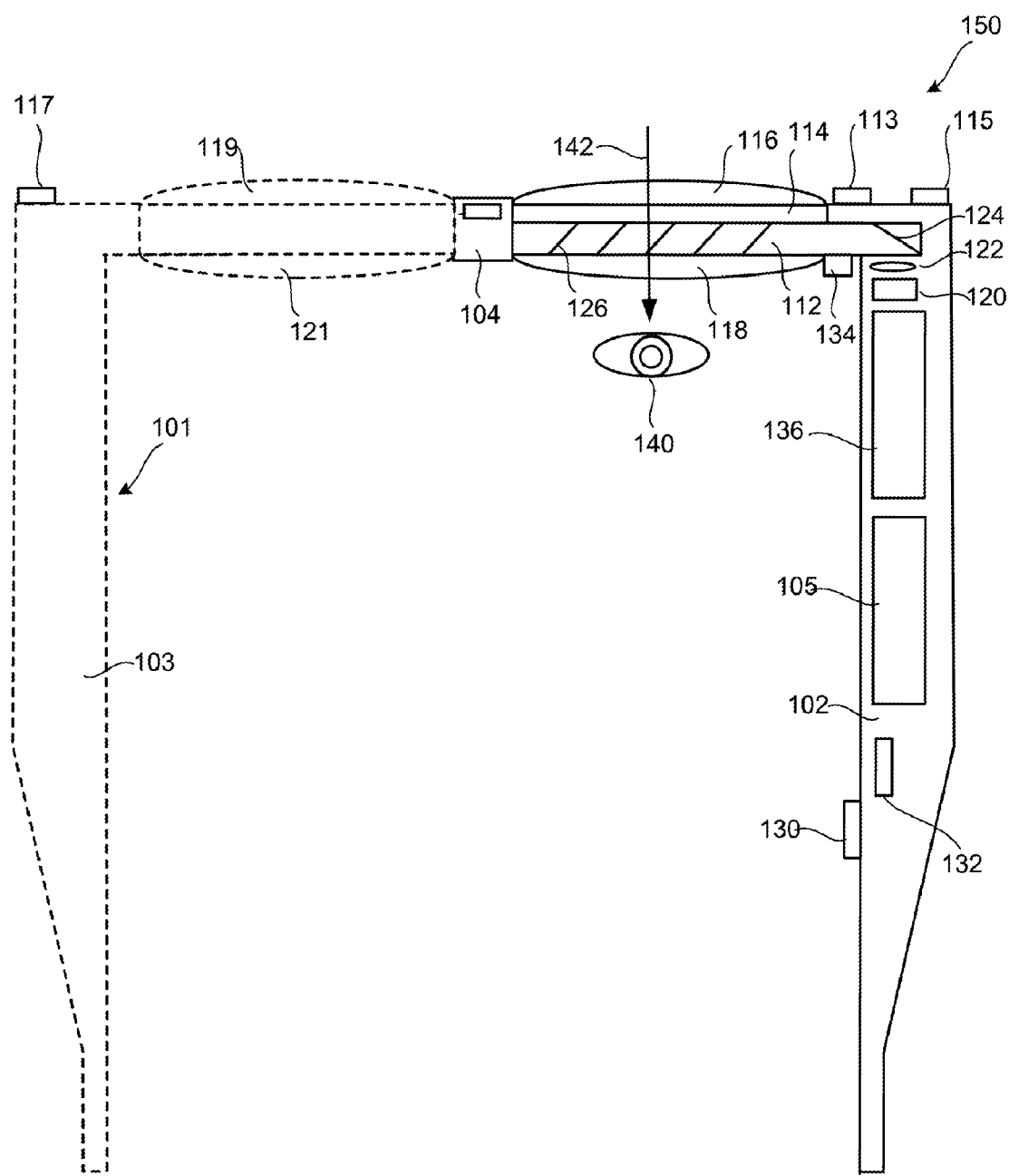
FIG. 2 is top view of an implementation of the rig 20 of FIG. 1 as a head mounted display (HMD) device 150.

FIG. 2 is top view of an implementation of the rig 20 of FIG. 1 as a head mounted display (HMD) device 150. Only the right side of the HMD device is depicted in detail. The HMD device includes a head-mounted frame 101 which can be generally in the shape of an eyeglass frame, temples 102 and 103, and a front lens frame including a nose bridge 104. Built into nose bridge 104 is a microphone 110 for recording sounds, including spoken user commands, and transmitting corresponding audio data to processing unit 105. Lenses 116 and 119 are see-through, in an example of a see-through near-to-the-eye HMD device. An immersive HMD device could alternatively be used.

The HMD device can be worn on the head of a user so that the user can see through a display and thereby see a real-world scene which includes an image which is not generated by the HMD device. The HMD device can be self-contained so that all of its components are carried by the frame. Optionally, one or more components of the HMD device are not carried by the frame. For example, one of more components which are not carried by the frame can be physically attached by a wire to a component carried by the frame.

Further, one of more components which are not carried by the frame can be in wireless communication with a component carried by the frame, and not physically attached by a wire or otherwise to a component carried by the frame. The one or more components which are not carried by the frame can be carried by the user, in one approach, such as on the wrist. For example, the processing unit 105 could be connected to a component in the frame via a wire or via a wireless link. The term "HMD device" can encompass both on-frame components and associated off-frame components.

The processing unit 105 includes much of the computing power used to operate the HMD device. The processor may execute instructions stored on a processor readable storage device for performing the processes described herein. In one embodiment, the processing unit communicates wirelessly with one or more servers, hub computing systems, other HMDs or other computing devices. Control circuits 136 provide various electronics that support the other components of the HMD device.

At the front of HMD device are one or more forward- or room-facing visible light cameras 113. The cameras can include at least one visible light video camera that can capture video and still images, and transmit the images to the processing unit. The camera can be used to identify features in the physical space, such as colors, patterns, shapes, lines and so forth. A depth sensor can be formed by the combination of an infrared emitter 115 and an infrared sensor/detector 117. The visible light camera may also be part of the depth sensor. The visible light camera 113 faces outward and has a viewpoint similar to that of the user.

A portion of the frame of the HMD device surrounds a display that includes one or more lenses. The display includes a light guide optical element 112, opacity filter 114, a front, right-side see-through lens 116 and a rear, right-side see-through lens 118. In one embodiment, opacity filter 114 is behind and aligned with see-through lens 116, light guide optical element 112 is behind and aligned with opacity filter 114, and see-through lens 118 is behind and aligned with light guide optical element 112. Opacity filter 114 filters out natural light (either on a per pixel basis or uniformly) to enhance the contrast of the augmented reality imagery. Light guide optical element 112 channels artificial light to the eye. Similarly, the left side of the HMD includes a front, left-side see-through lens 119 and a rear, left-side see-through lens 121.

Mounted to or inside temple 102 is an image source, which (in one embodiment) includes microdisplay 120 for projecting an augmented reality image and lens 122 for directing images from the microdisplay into light guide optical element 112. In one embodiment, lens 122 is a collimating lens. An augmented reality emitter can include the microdisplay, one or more optical components such as the lens 122 and light guide optical element 112, and associated electronics such as a driver. Such an augmented reality emitter is associated with the HMD device, and emits light to a user's eye, where the light represents augmented reality still or video images. This can be used to display a virtual object in a physical space.

Figure 3:
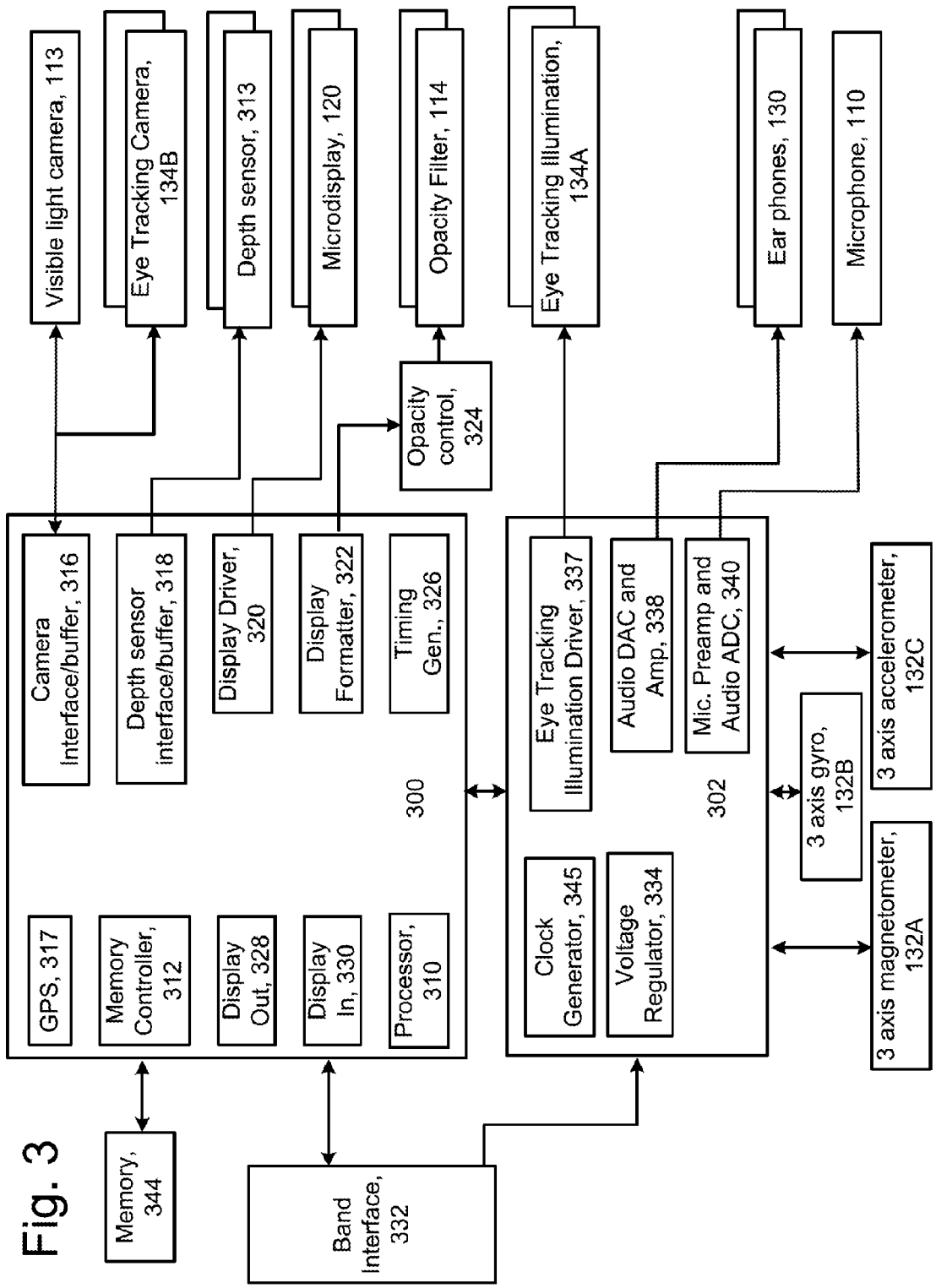
FIG. 3 is a block diagram depicting the various components of HMD device 150 of FIG. 2.

Control circuits 136, discussed further in connection with FIG. 3, provide various electronics that support the other components of HMD device. Inside, or mounted to temple 102, are ear phones 130 and inertial sensors 132 (e.g., an example of the orientation sensor 27 of FIG. 1). In one embodiment, the inertial sensors 132 include a three axis magnetometer 132A, three axis gyroscope 132B and three axis accelerometer 132C (see FIG. 3). The inertial sensors are for sensing position, orientation, sudden accelerations of HMD device. For example, the inertial sensors can be one or more sensors which are used to determine an orientation and location of the HMD worn on the user's head.

The microdisplay projects an image through lens 122. Light guide optical element 112 transmits light from the microdisplay to the eye 140 of the user while allowing light from in front of the HMD device to be transmitted through light guide optical element to eye 140, as depicted by arrow 142, allowing the user to have an actual direct view of the space in front of HMD device, in addition to receiving an augmented reality image from the microdisplay. Thus, the walls of light guide optical element are see-through. Light guide optical element includes a first reflecting surface 124 (e.g., a mirror or other surface). Light from the microdisplay passes through lens 122 and is incident on reflecting surface 124, which reflects the incident light such that light is trapped inside a planar, substrate comprising light guide optical element by internal reflection. After several reflections off the surfaces of the substrate, the trapped light waves reach an array of selectively reflecting surfaces, including example surface 126.

Reflecting surfaces 126 couple the incident light waves out of the substrate into the eye 140 of the user. Different light rays will travel and bounce off the inside of the substrate at different angles as they hit the various reflecting surface 126 at different angles. Therefore, different light rays will be reflected out of the substrate by different ones of the reflecting surfaces. The selection of which light rays will be reflected out of the substrate by which surface 126 is engineered by selecting an appropriate angle of the surfaces 126. In one embodiment, each eye will have its own light guide optical element. When the HMD device has two light guide optical elements, each eye can have its own microdisplay that can display the same image in both eyes or different images in the two eyes. In another embodiment, there can be one light guide optical element which reflects light into both eyes.

FIG. 3 is a block diagram depicting the various components of HMD device 150 of FIG. 2. The HMD device components include many sensors that track various conditions. In an example implementation, the HMD device can receive instructions about an augmented reality image from the processing unit 105 and provide the sensor information back to the processing unit, depicted in FIG. 4. Optionally, the processing unit also receives sensory information from a server or a hub computing device. Based on that information, and/or other criterion, the processing unit can determine where and when to provide an augmented reality image to the user and send instructions accordingly to the HMD device.

Note that some of the components (e.g., eye tracking camera 134B, microdisplay 120, opacity filter 114, eye tracking illumination 134A and earphones 130) are shown in shadow to indicate that there are two of each of those devices, one for the left side and one for the right side of HMD device. Similarly, the depth sensor 313 can include an infrared emitter 115 and an infrared sensor/detector 117, for instance. In another approach, two or more cameras with a known spacing between them are used as a depth camera to obtain depth data for objects in a room, indicating the distance from the cameras/HMD device to the object. Optionally, one visible light camera 113 is used. The eye tracking camera 134B and the eye tracking illumination 134A are part of an eye tracking component 134.

Images from the forward-facing cameras can be used to identify people, hand gestures and other objects in a field of view of the user. For example, it can be determined when the user makes a hand gesture such as pointing at an object. The real-world object can be identified and associated with a data stream, or used as the location to display a previously-associated data stream.

A control circuit 300 communicates with the power management circuit 302. Control circuit 300 includes processor 310, memory controller 312 in communication with memory 344 (e.g., DRAM), camera interface 316, camera buffer 318, display driver 320, display formatter 322, timing generator 326, display out interface 328, and display in interface 330. A GPS circuit 317 can be used to identify the location of the HMD device.

In one embodiment, all of components of control circuit 300 are in communication with each other via dedicated lines or one or more buses. In another embodiment, each of the components of control circuit 300 communicates with processor 310. A camera interface/buffer 316 provides an interface to, and stores images from, the visible light camera. A depth sensor interface/buffer 318 provides an interface to, and stores images from, the depth sensor.

Display driver 320 drives the microdisplay. Display formatter 322 provides information, about the augmented reality image being displayed on the microdisplay, to opacity control circuit 324, which controls opacity filter 114. Timing generator 326 is used to provide timing data for the system. Display out interface 328 is a buffer for providing images from forward-facing cameras 113 to the processing unit 105. Display in interface 330 is a buffer for receiving images such as an augmented reality image to be displayed on the microdisplay.

Display out interface 328 and display in interface 330 communicate with band interface 332 which is an interface to processing unit, when the processing unit is attached to the frame of the HMD device by a wire, or communicates by a wireless link, and is worn on the wrist of the user on a wrist band. This approach reduces the weight of the frame-carried components of the HMD device. In other approaches, as mentioned, the processing unit can be carried by the frame and a band interface is not used.

Power management circuit 302 includes voltage regulator 334, eye tracking illumination driver 337, audio DAC and amplifier 338, microphone preamplifier audio ADC 340 and clock generator 345. Voltage regulator 334 receives power from processing unit via band interface 332 and provides that power to the other components of HMD device. Eye tracking illumination driver provides the infrared (IR) light source for eye tracking illumination 134A, as described above. Audio DAC and amplifier 338 receives the audio information from earphones 130. Microphone preamplifier and audio ADC 340 provides an interface for microphone 110. Power management unit 302 also provides power and receives data back from three-axis magnetometer 132A, three-axis gyroscope 132B and three axis accelerometer 132C, as part of an orientation sensor.

Figure 4:
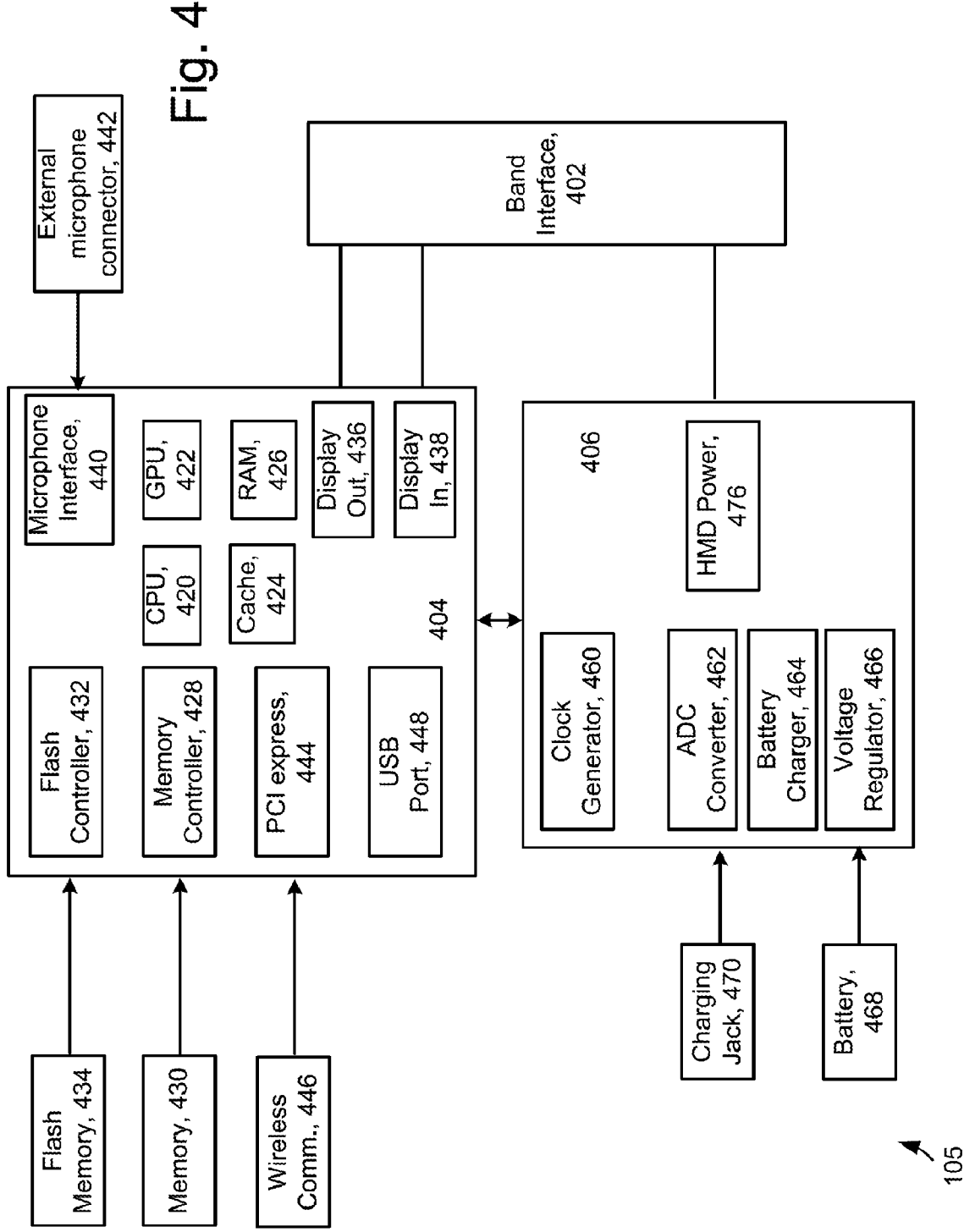
FIG. 4 is a block diagram describing the various components of processing unit 105 of FIG. 2.

FIG. 4 is a block diagram describing the various components of the processing unit 105 of FIG. 2. Control circuit 404 communicates with power management circuit 406. Control circuit 404 includes a central processing unit (CPU) 420, graphics processing unit (GPU) 422, cache 424, RAM 426, memory control 428 in communication with memory 430 (e.g., DRAM), flash memory controller 432 in communication with flash memory 434 (or other type of nonvolatile storage), display out buffer 436 in communication with HMD device via band interface 402 and band interface 332 (when used), display in buffer 438 in communication with HMD device via band interface 402 and band interface 332 (when used), microphone interface 440 in communication with an external microphone connector 442 for connecting to a microphone, Peripheral Component Interconnect (PCI) express interface 444 for connecting to a wireless communication component 446, and USB port(s) 448.

In one embodiment, wireless communication component 446 can include a Wi-Fi® enabled communication device, BLUETOOTH® communication device, or infrared communication device. The wireless communication component 446 is a wireless communication interface which, in one implementation, receives data in synchronism with the content displayed by the HMD device. Further, augmented reality images may be displayed in response to the received data. In one approach, such data is received from a server, a hub computing system, a local Wi-Fi® network or WLAN, a cell phone network, a local storage device or other source.

The USB port can be used to dock the processing unit to hub computing system 50 to load data or software onto processing unit, as well as charge processing unit. In one embodiment, CPU 420 and GPU 422 are the main workhorses for determining where, when and how to insert augmented reality images into the view of the user.

Power management circuit 406 includes clock generator 460, analog to digital converter 462, battery charger 464, voltage regulator 466 and HMD power source 476. Analog to digital converter 462 is connected to a charging jack 470 for receiving an AC supply and creating a DC supply for the system. Voltage regulator 466 communicates with battery 468 for supplying power to the system. Battery charger 464 is used to charge battery 468 (via voltage regulator 466) upon receiving power from charging jack 470. HMD power source 476 provides power to the HMD device.

The calculations that determine where, how and when to insert an augmented reality image can be performed by the HMD device and/or by a computing device which communicates with the HMD device.

In one example embodiment, the HMD device will create a model of the environment that the user is in and track various objects in that environment, based on the field of view of the HMD device. The model and the tracking information are provided to processing unit. Sensor information obtained by HMD device is transmitted to processing unit. Processing unit refines the field of view of the user and provide instructions to HMD device on how, where and when to insert augmented reality images.

Figure 5:
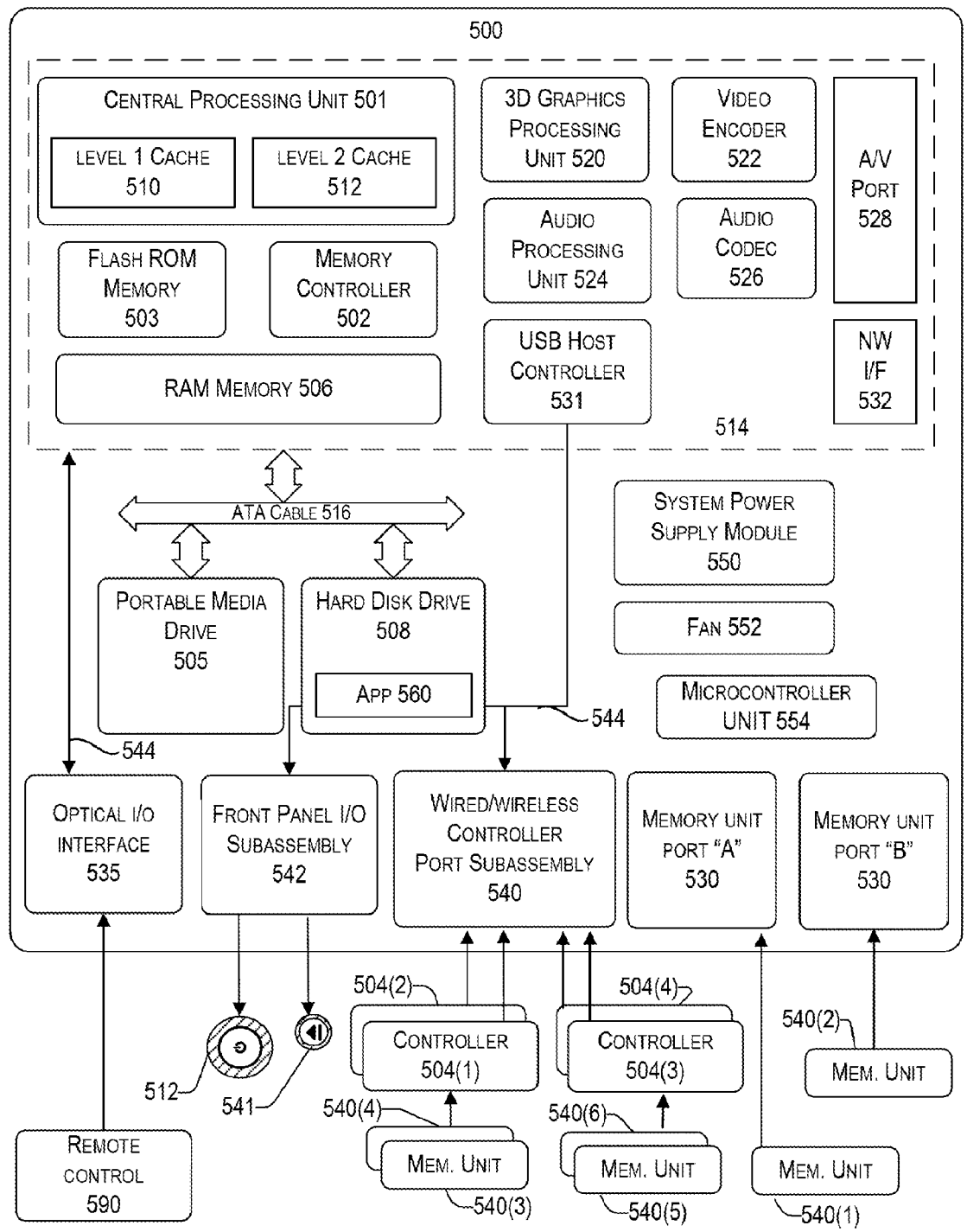
FIG. 5 is a block diagram of one embodiment of the hub computing system 50 of FIG. 1.

FIG. 5 is a block diagram of one embodiment of the hub computing system 50 of FIG. 1. In this embodiment, the computing system is a multimedia console 500 such as a gaming console. The multimedia console has a CPU 501, and a memory controller 502 that facilitates processor access to various types of memory, including a flash Read Only Memory (ROM) 503, a Random Access Memory (RAM) 506, a hard disk drive 508, and portable media drive 505. In one implementation, CPU includes a level 1 cache 510 and a level 2 cache 512, to temporarily store data and hence reduce the number of memory access cycles made to the hard drive 508, thereby improving processing speed and throughput.

CPU, memory controller, and various memory devices are interconnected via one or more buses (not shown).

In one implementation, CPU, memory controller, ROM, and RAM are integrated onto a common module 514. In this implementation, ROM is configured as a flash ROM that is connected to memory controller via a PCI bus and a ROM bus (neither of which are shown). RAM is configured as multiple Double Data Rate Synchronous Dynamic RAM (DDR SDRAM) modules that are independently controlled by memory controller via separate buses (not shown). Hard disk drive and portable media drive are shown connected to the memory controller via the PCI bus and an AT Attachment (ATA) bus 516.

A GPU 520 and a video encoder 522 form a video processing pipeline for high speed and high resolution graphics processing.

An audio processing unit 524 and an audio codec (coder/decoder) 526 form a corresponding audio processing pipeline for multi-channel audio processing of various digital audio formats. Audio data are carried between audio processing unit and the audio codec via a communication link (not shown). The video and audio processing pipelines output data to an A/V (audio/video) port 528 for transmission to a television or other display. In the illustrated implementation, video and audio processing components 520-528 are mounted on the module.

The module 514 includes a USB host controller 531 and a network interface 532. USB host controller is shown in communication with CPU and memory controller via a bus (e.g., PCI bus) and serves as host for peripheral controllers 504(1)-504(4). Network interface provides access to a network (e.g., Internet, home network, etc.) and may be any of a wide variety of various wired or wireless interface components.

In the implementation depicted, the console includes a controller support subassembly 540 for supporting the four peripheral controllers. The controller support subassembly includes any hardware and software components needed to support wired and wireless operation with an external control device, such as for example, a media and game controller. A front panel I/O subassembly 542 supports the multiple functionalities of power button 512, the eject button 541, as well as any LEDs (light emitting diodes) or other indicators exposed on the outer surface of console. Subassemblies and are in communication with module via one or more cable assemblies 544. In other implementations, the console can include additional controller subassemblies. An optical I/O interface 535 sends and receives signals that can be communicated to module 514. The interface may be responsive to a remote control 590.

Memory units (MUs) 540(1) and 540(2) are connectable to MU ports "A" 530(1) and "B" 530(2) respectively. Additional MUs (e.g., MUs 540(3)-540(6)) are illustrated as being connectable to the peripheral controllers 504(1) and 504(3), i.e., two MUs for each controller. Controllers 504(2) and 504(4) can also be configured to receive MUs (not shown). Each MU offers additional storage on which games, game parameters, and other data may be stored. In some implementations, the other data can include any of a digital game component, an executable gaming application, an instruction set for expanding a gaming application, and a media file. When inserted into the console or a controller, MU can be accessed by memory controller. A system power supply module 550 provides power to the components of the console. A fan 552 cools the circuitry within the console. A microcontroller unit 554 is also provided.

An application 560 comprising machine instructions is stored on hard disk drive. When the console is powered on, various portions of application are loaded into the RAM, and/or the caches, for execution on the CPU, wherein application is one such example. Various applications can be stored on hard disk drive for execution on CPU.

The console may be operated as a standalone system by simply connecting the system to a monitor, a television, a video projector, or other display device. In this standalone mode, the console enables one or more players to play games, or enjoy digital media, e.g., by watching movies, or listening to music. However, with the integration of broadband connectivity made available through network interface, the console may further be operated as a participant in a larger network gaming community.

FIG. 6A depicts a process for reconstructing surfaces in a physical space using a pose graph. Step 600 indicates that a rig moves in different poses in a physical space. Step 601 involves obtaining images of the physical space from a visible light camera on the rig. Step 602 involves obtaining orientation readings from an orientation sensor on the rig. Step 603 involves processing the images and orientation readings to provide and update a pose graph. Step 604 obtaining orientation depth maps of volumes of the physical space from a depth sensor on the rig. Step 605 involves anchoring the volumes to nodes in the pose graph. Step 606 involves reconstructing surfaces in the physical space based on a state of the pose graph. Note that the some of the steps can be performed concurrently or in different orders. Generally, the obtaining of the images and the updating of the pose graph can occur separately from the obtaining of the depth maps and the reconstructing of the surfaces. Similarly, the obtaining of the depth maps can occur separately from the obtaining of the images and the updating of the pose graph. As the rig continues to move, additional images and depth maps may be captured and processed. Further details regarding the process are provided below.

FIG. 6B depicts further details of step 603 of FIG. 6A. Step 603 involved processing images and orientation readings to provide and update a pose graph. Step 610 involves inputting an orientation reading and an image of a pose of the rig, and determining image features. Generally, an image can be processed to represent it in a compact way, to reduce data storage requirements and to facilitate feature-based image matching. An image can include features such as colors, patterns, shapes, lines and so forth, and common features in two images can be identified. One way to represent images is to use a feature detector and descriptor. Popular descriptors include the Scale Invariant Feature Transform (SIFT) and Speeded Up Robust Features (SURF). These are known to be robust to scale, rotation and illumination changes.

For instance, in the SIFT technique, keypoints of objects in a physical space are first extracted from a set of reference images and stored in a database. An object is recognized in a new image by individually comparing each feature from the new image to this database and finding candidate matching features based on Euclidean distance of their feature vectors. From the full set of matches, subsets of keypoints that agree on the object and its location, scale, and orientation in the new image are identified to filter out good matches. The determination of consistent clusters is performed rapidly by using an efficient hash table implementation of the generalized Hough transform. Each cluster of three or more features that agree on an object and its pose is then subject to further detailed model verification and, subsequently, outliers are discarded. Finally, the probability that a particular set of features indicates the presence of an object is computed, given the accuracy of fit and number of probable false matches. Object matches that pass all these tests can be identified as correct with high confidence. See, e.g., U.S. Pat. No. 6,711,293, "Method and apparatus for identifying scale invariant features in an image and use of same for locating an object in an image," David Lowe, issued Mar. 23, 2004 and incorporated herein by reference.

Decision step 611 determines whether the pose is new. In one approach, if the pose is not sufficiently different than a previous pose or another pose, it may not be considered to be new, in which case the flow returns to step 610. For example, the pose may be new if the orientation is significantly different than in other nodes. Or, the pose may be new if features of the image are significantly different than in other nodes or if a specified amount of time has passed since last new pose. In one approach, the camera provides a sequence of video images and selected images are suitable for use in defining a node.

If the pose is new, step 612 adds a new node to the pose graph. Step 613 determines a coordinate system associated with the orientation of the pose. Or, the coordinate system may already have been determined. Step 614 associates the image taken with the pose (e.g., the image captured by the camera on the rig when the rig/camera has assumed the pose) and the coordinate system with the new node. For example, this can involve storing the information in a database, as discussed further below. An image can be represented and stored in any form, including pixel data and/or extracted feature data. Step 615 determines a correspondence between the image associated with the new node and images of one or more other nodes in the pose graph. For instance, this can involve comparing the features of the image of the new node to features of images of one or more other nodes which are close to the new node in the pose graph. The correspondence between two images is relatively high when the features in the two images are relatively similar. For example, the degree of correspondence can be determined using the SIFT technique.

Step 616 determines a transform between the coordinate system of the new node and the coordinate systems of the one or more other nodes. Step 617 associates the transform and the correspondence with one or more links between the new node and the one or more other nodes. Step 618 updates the other nodes and links in the pose graph if appropriate. For example, updating of the state of the pose graph can involve performing a bundle adjustment in which the coordinate systems and the transforms are adjusted, or updating one or more of the correspondences, or performing a relocalization in which there is a change in topology in the pose graph. For instance, the relocalization can comprise a loop closure, in which a closed loop of the nodes is formed in the pose graph.

Figure 6C:
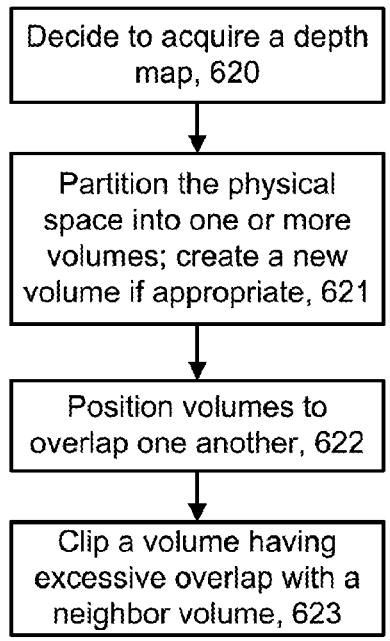
FIG. 6C depicts further details of step 604 of FIG. 6A.

FIG. 6C depicts further details of step 604 of FIG. 6A. Step 604 involved obtaining depth maps of volumes of the physical space from the depth sensor on the rig. Step 620 involves deciding to acquire a depth map. For example, this can occur when the rig is aimed at an area of a physical space for which depth data has not been obtained. Step 621 involves partitioning the physical space into one or more volumes, and creating a new volume if appropriate. A volume can be a uniformly shaped space such as a cube in the physical space. In one approach, the volume is divided into sub-volumes referred to as blocks, where there are N×N×N blocks per volume, and N is an integer of one or more. Further, each block can be divided into 8×8×8 voxels. Step 622 involves positioning the volumes to overlap one another. For example, the amount of overlap can be set to exceed a minimum threshold but to not exceed a maximum threshold when a volume is initially positioned. See FIGS. 10A and 10B for further details. The position of a volume can be adjusted after the volume is initially positioned, so that the amount of overlap can change. However, the initial use of overlap tends to avoid gaps from forming when the position of a volume is adjusted. Step 623 involves clipping a volume having an excessive amount of overlap, e.g., more than a maximum threshold. See FIGS. 11A and 11B.

Figure 6D:
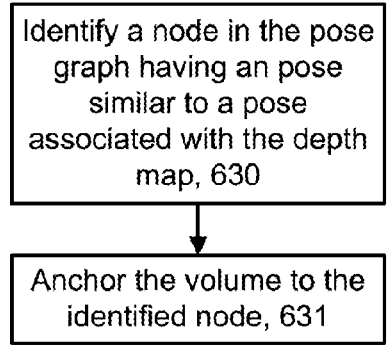
FIG. 6D depicts further details of step 605 of FIG. 6A.

FIG. 6D depicts further details of step 605 of FIG. 6A. Step 605 involved anchoring the volumes to nodes in the pose graph. Step 630 involves identifying a node in the pose graph having a pose similar to a pose associated with the depth map. That is, the pose of the rig which was used to create a node in the pose graph is similar to, or the same as, the pose of the rig when the depth map was captured. In one approach, the poses are the same and occur at the same time. In another approach, the poses are the same or similar and occur at different times. Step 631 involves anchoring the volume to the identified node, e.g., in a database as discussed further below. Thus, a volume is associated with a node such that the volume is positioned in the physical space based on the coordinate system of the node. When the coordinate system of the node is adjusted, the position of the volume in the physical space is also adjusted. Typically, a volume continues to be anchored to one node, but it is possible for a volume to be re-anchored to a different node, such as if the pose of the different nodes becomes closer to the pose used to obtain the volume, due to updating of the pose graph. Also, the volumes can be anchored to the nodes on a one-to-one or many-to-one basis.

Figure 6E:
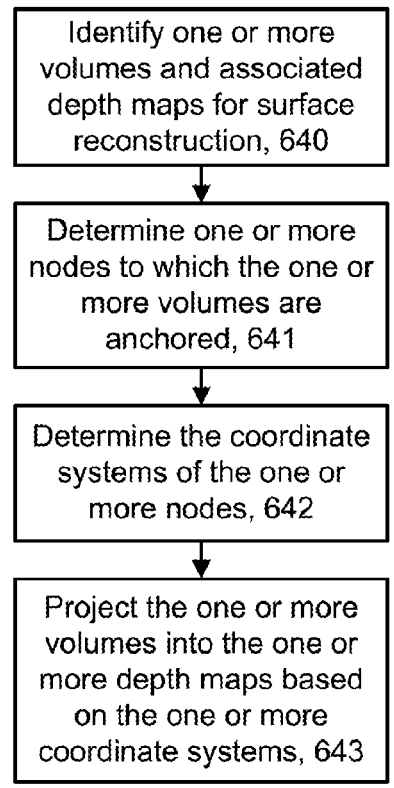
FIG. 6E depicts further details of step 606 of FIG. 6A.

FIG. 6E depicts further details of step 606 of FIG. 6A. Step 606 involved reconstructing surfaces in the physical space based on a state of the pose graph. Step 640 involves identifying one or more volumes and associated depth maps for surface reconstruction. For example, these volumes may correspond to a portion of a physical space in the user's field of view. As the user turns his head and looks at different portions of the physical space, the volumes involved in surface reconstruction can change accordingly. Step 641 involves determining one or more nodes to which the one or more volumes are anchored. This can be done by looking up a node which is cross referenced to a volume in a database. Step 642 involves determining the coordinate systems of the one or more nodes. This can be done by looking up a coordinate system which is cross referenced to a node in a database. Step 643 involves projecting the one or more volumes into the one or more depth maps based on the one or more coordinate systems. Essentially, the depth map is defined with respect to a coordinate system such that the depth values of the depth map are associated with portions of a volume based on the coordinate system.

Figure 7:
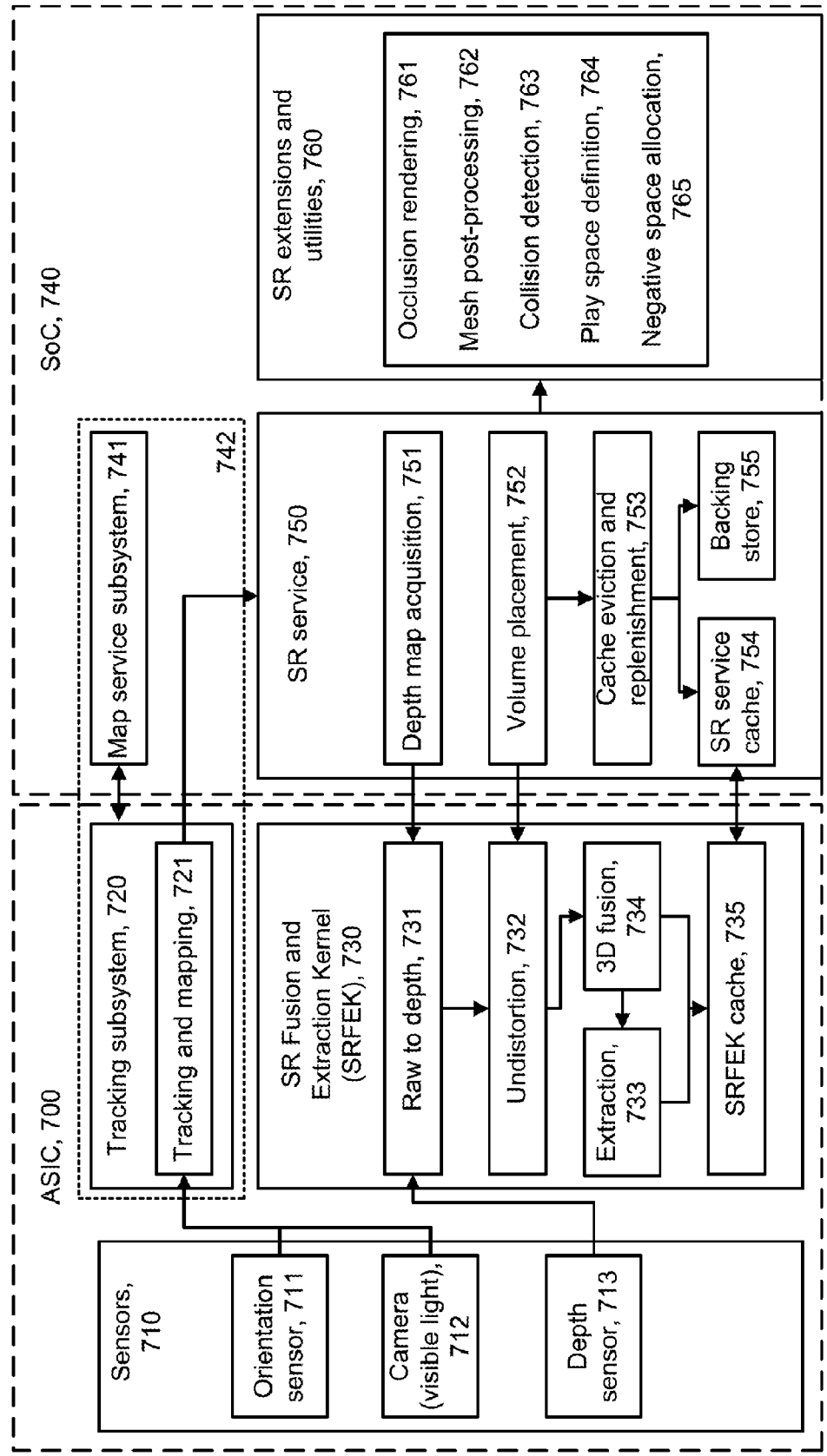
FIG. 7 depicts a surface reconstruction pipeline for carrying out the process of FIG. 6A.

FIG. 7 depicts a surface reconstruction pipeline for carrying out the process of FIG. 6A. In this example implementation, the SR pipeline runs across both an Application-Specific Integrated Circuit (ASIC) 700 and a System-on-a-Chip (SoC) 740. The ASIC and SoC each host multiple devices and subsystems. Arrows indicate a data flow direction. Sensors 710 connect to the ASIC. The sensor are carried on a rig such as an HMD device or a robot. These sensors include an orientation sensor 711 such as an inertial measurement unit (IMU) which senses rotation and linear acceleration. A visible light camera 712 obtains visible light images of a physical space and a depth sensor 713 obtains a depth map of a physical space. An example implementation uses a time of flight camera as the depth sensor. This sensor measures the round-trip time of light flashed from the camera, bounced off surfaces in the physical space, and returned to the sensor. The total round-trip time takes tens of nanoseconds. Another implementation of the depth sensor is a stereo pair of visible light cameras, but this approach may result in a lower quality depth map.

A tracking subsystem 720 converts sensor data into poses and a map of interconnected coordinate frames. For example, this can be a head tracking subsystem in the example case of an HMD device. The tracking subsystem 720 is responsive to a map service subsystem 741, and includes a tracking and mapping process 721. The tracking subsystem 720 and the map service subsystem 741 together form a tracking and mapping subsystem 742.

An SR Fusion and Extraction Kernel (SRFEK) converts depth maps and poses into surface data. The SRFEK runs on the ASIC, and communicates with other processes in both the ASIC and the SoC. The SRFEK takes in two pieces of input data: depth maps and poses. A raw to depth subsystem 731 captures raw infrared images from the depth sensor and converts them into depth values in depth maps. The depth values indicates a distance of one or more surfaces in the physical space from the depth sensor. These depth maps have lens distortion. To address this, an undistortion subsystem 732 removes the effects of distortion from the lens of the camera from the depth images, to provide an undistorted depth map. This can involve applying a model of lens distortion, whose parameters are measured through calibration, to yield a flat undistorted image. At runtime, this can involve creating an undistortion map (a lookup table) and applying it to each depth map pixel.

A 3D fusion subsystem 734 combines the undistorted depth map with a pose to fuse it into a 3D volume. Fusion involves projecting depth maps (which are 2D images) into a volume (which is 3D). For example, a signed distance function (SDF) can be used which represents a distance from the depth sensor to the surface of an object. See FIGS. 8A and 8B for further details.

An extraction algorithm 733 creates a polygon mesh from that volumetric data. Not all applications require a polygon mesh, but they are often useful in applications such as game engines which use meshes for rendering and collision. One way to extract a mesh after populating the SDF volume uses an algorithm called Marching Cubes. The idea behind Marching Cubes involves turning each box of volumetric data into a set of polygons, where the vertices of those polygons lie on edges of the boxes. For further details, see U.S. Pat. No. 4,710,876, "System and method for the display of surface structures contained within the interior region of a solid body," incorporated herein by reference.

Outputs of the 3D fusion subsystem 734 and the extraction algorithm 733 can be stored in a SRFEK cache 735. This output includes the reconstructed surfaces which represent the geometry of the physical space.

A SR service 750 is a higher level process which controls SRFEK, giving it chunks of data and commands to process that data. The SR service also feeds surface data which is obtained from surface reconstruction to applications. The service includes a depth map acquisition subsystem 751 which decides when to trigger the acquisition of depth maps, based on where and when they are needed. A volume placement subsystem 752 decides how to partition the physical space into volumes, e.g., how many volumes to create and where to place them. Deciding where to place volumes is the initial problem. We can start with a set of previously-defined SR volumes. See FIGS. 9A and 9B for further details.

SR data can occupy a lot of memory, so the service decides which data to keep in memory, e.g., an SR service cache 754, and which to store for later use, e.g., in a backing store 755, using a cache eviction and replenishment subsystem 753. The SR service decides what SR data to evict and replenish, when to evict and replenish the data, and supplies applications with SR data. The SR service is useful in managing scale, both in terms of the size of the physical space and the quantity of data which is generated. The system should work on physical scales that extend beyond the immediate vicinity of the user, e.g., in physical spaces of several meters such as in an office building. Brute-force solutions will not work because even modestly-sized regions uses hundreds or thousands of SR volumes and each SR volume can use a few megabytes. The SR system can scale by partitioning a space into volumes and paging (e.g., transferring) those volumes between memory and disk.

The SR Service can accomplish both persistence and data scalability with the cache eviction and replenishment subsystem. For example, this subsystem can establish a maximum number of volumes. This provides a cap on the amount of SoC main memory the SR service consumes. When that cap would be exceeded by adding more data, or more SR volumes, we can evict some other volumes. This is analogous to a least-recently-used (LRU) eviction policy, except the SR Service can evict the farthest volumes, e.g., farthest from the rig. Moreover, when the rig re-enters a region for which it previously captured SR data, the cache can be replenished with that data. Thus, we can intermittently replenish the cache from the backing store by loading the closest volumes to the rig. Note that new volumes can still be added so they also contribute to the cache population.

Many applications can consume SR data in similar ways. An SR extensions and utilities subsystem 760 provides common functionality for application developers. Extensions and utilities can include occlusion rendering 761 for occluding holograms with real-world geometry, mesh post-processing 762 to add useful auxiliary information, collision detection 763 between real and virtual objects, play space definition 764 and negative space allocation 765 to help with hologram placement. Examples of SR mesh post-processing routines include welding vertices, zippering meshes, computing surface normals, clipping triangles from overlapping meshes, smoothing meshes, and simplifying meshes to reduce the number of polygons.

Regarding hologram placement, meshes can be too fine and complicated for certain kinds of hologram placement logic. Instead, application developers can find it easier to deal with abstractions such as walls, ceilings and floors. One solution is to find flat triangles, identify connected flat regions, and then fit planes to those regions. To find contiguous regions of low curvature, multiple separate meshes are first combined into a single contiguous mesh. This is where welding and zippering are useful.

Regarding computing surface normals, to find flat regions, it is useful to compute surface curvature. The SR pipeline can generate per-vertex normals, either from the SDF (using finite differences) or from the mesh (using per-face normals).

Another example of SR mesh post-processing is applying texture as captured from the camera.

Figure 8A:
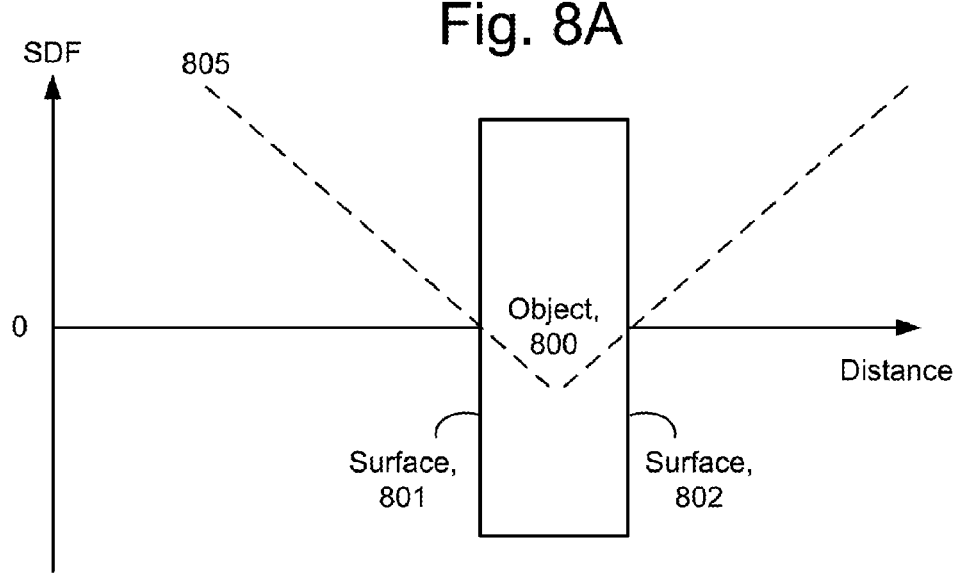
FIG. 8A depicts an example of a signed distance function (SDF) as discussed in connection with the 3D fusion subsystem 734 of FIG. 7.

FIG. 8A depicts an example of a signed distance function (SDF) as discussed in connection with the 3D fusion subsystem 734 of FIG. 7. The horizontal axis depicts a distance from the depth sensor to an object 800 in a physical space. The vertical axis depicts a value of the SDF. The object has a front surface 801 and a back surface 802. A line 805 represents the SDF. Regions outside the object have a positive distance, regions inside the object to have a negative distance, and regions at a surface of the object have a value of zero. In some cases, the front surface of an object but not the back surface is detected. Fusion involves populating a volume of voxels with SDF values inferred from projecting voxels into depth maps. We start with an SDF volume, then acquire a depth map and its pose relative to that volume. The fusion algorithm injects a posed depth map as follows. For each voxel, project it into the depth map and update the SDF value according to the distance of the voxel relative to the distance from the surface. Surfaces lie on the boundary between negative and positive SDF values, where the function is zero—the so-called zero level set. This procedure is repeated for each depth map.

Figure 8B:
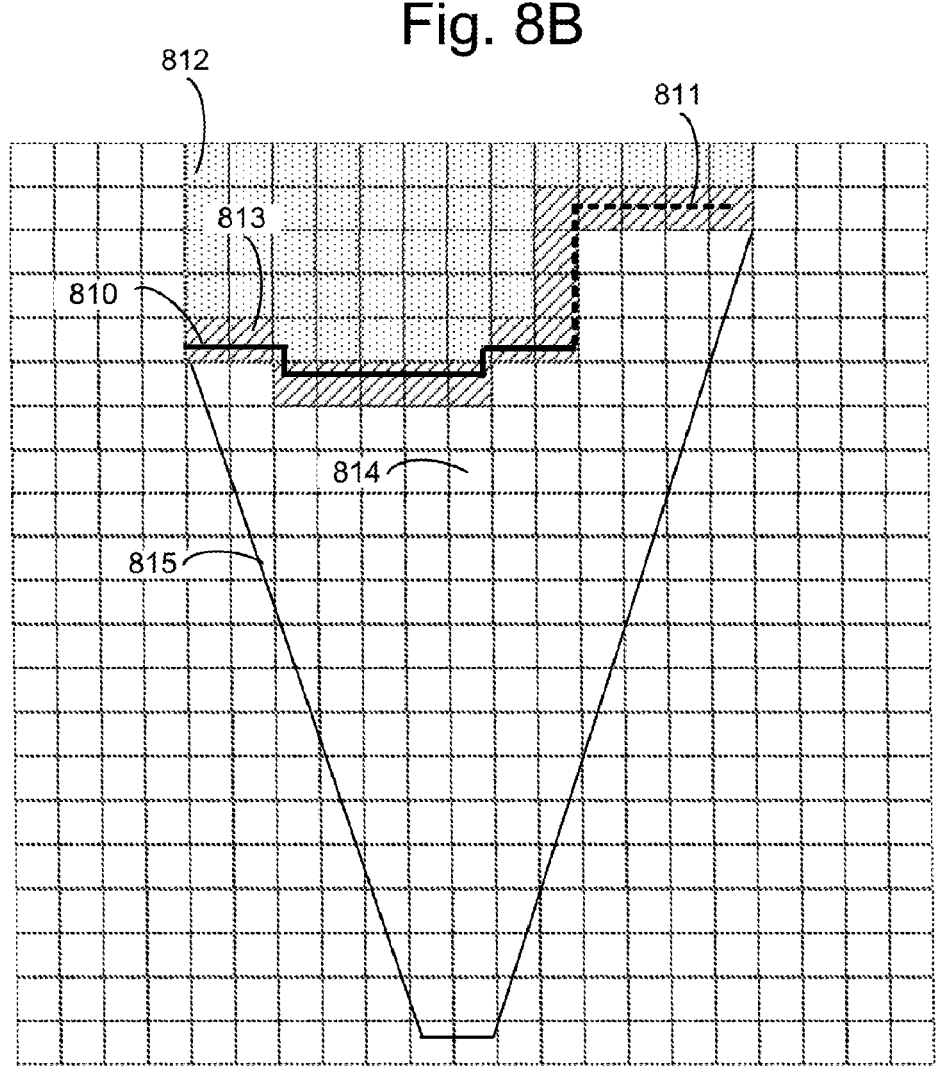
FIG. 8B depicts an example of a depth map projected into voxels as discussed in connection with the 3D fusion subsystem 734 of FIG. 7.

FIG. 8B depicts an example of a depth map projected into voxels. Each square represents a voxel. The voxels shown can be part of one or more blocks. A solid line 810 represents a surface of an object. A dashed line 811 represents a surface which is not detected but is assumed to be far from the sensor, past the maximum depth which can be sensed. Depth values for this surface can be set at a default depth. Voxels traversed by these lines have SDF=0 and are represented by a diagonal lined pattern, such as with voxel 813. Voxels which are considered to be within the object have SDF<0 are represented by a dotted pattern, such as with voxel 812. Voxels which are considered to be outside the object have SDF>0 and are represented by unpatterned boxes, such as with voxel 814. A line 815 represents a boundary of a view frustum of the depth sensor. The view shown can be an overhead view of a room, where the line 810 represents a wall and a frame on the wall.

Figure 9A:
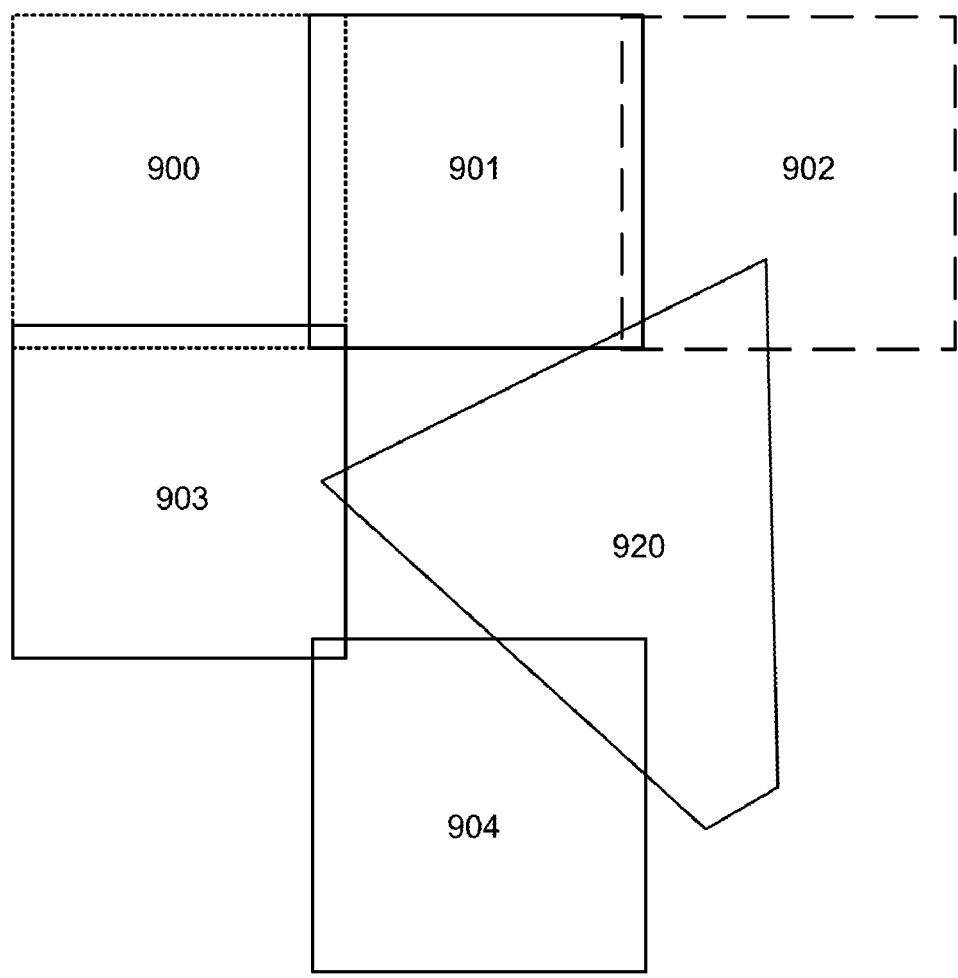
FIG. 9A depicts a set of volumes 900-904 and a frustum 920 of a depth sensor.

FIG. 9A depicts a set of volumes 900-904 and a frustum 920 of a depth sensor. Note that some overlap between the volumes is shown. Some of the volumes are shown with dashed line patterns to clearly distinguish the volumes from one another. When the SR service decides to acquire a depth map, the depth sensor is activated. The frustum represents the field of view of the depth sensor, e.g., a portion of the physical space in which depth readings can be obtained. The SR service then compares the depth map frustum with the set of SR volumes. If any portion of the depth map frustum is not covered by any SR volume, the service can create a new volume. However, the placement of the new volume, including its orientation relative to the other volumes, is an issue. The new volume can be initially placed somewhere where the frustum lacks coverage by any existing volume. Then, the new volume is repositioned to align with the existing volumes. The repositioning can involve a translation and/or a rotation in the physical space which refines the new volume's position. This can include providing a desired amount of overlap of the new volume relative to one or more existing volumes.

Figure 9B:
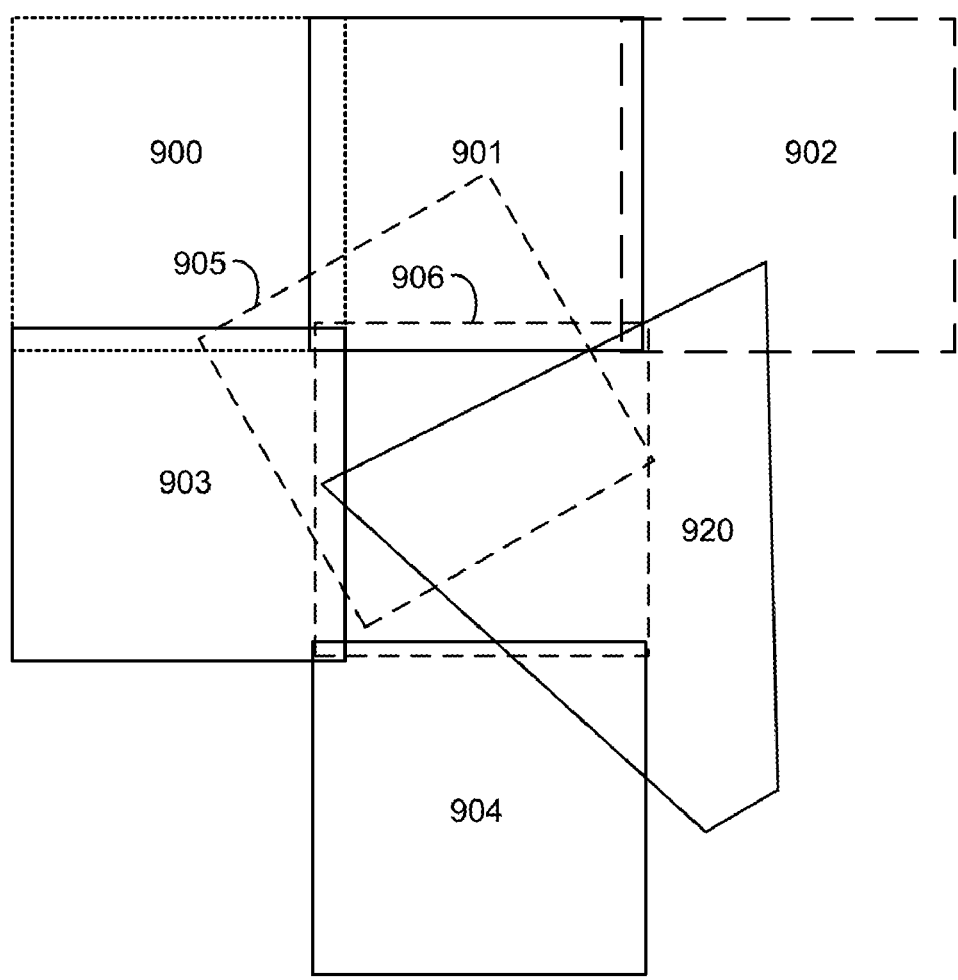
FIG. 9B depicts a new volume which is added to the set of volumes 900-904 of FIG. 9A, as represented by an initially-placed volume 905 and a repositioned volume 906.

FIG. 9B depicts a new volume which is added to the set of volumes 900-904 of FIG. 9A, as represented by an initially-placed volume 905 and a repositioned volume 906.

Figure 10A:
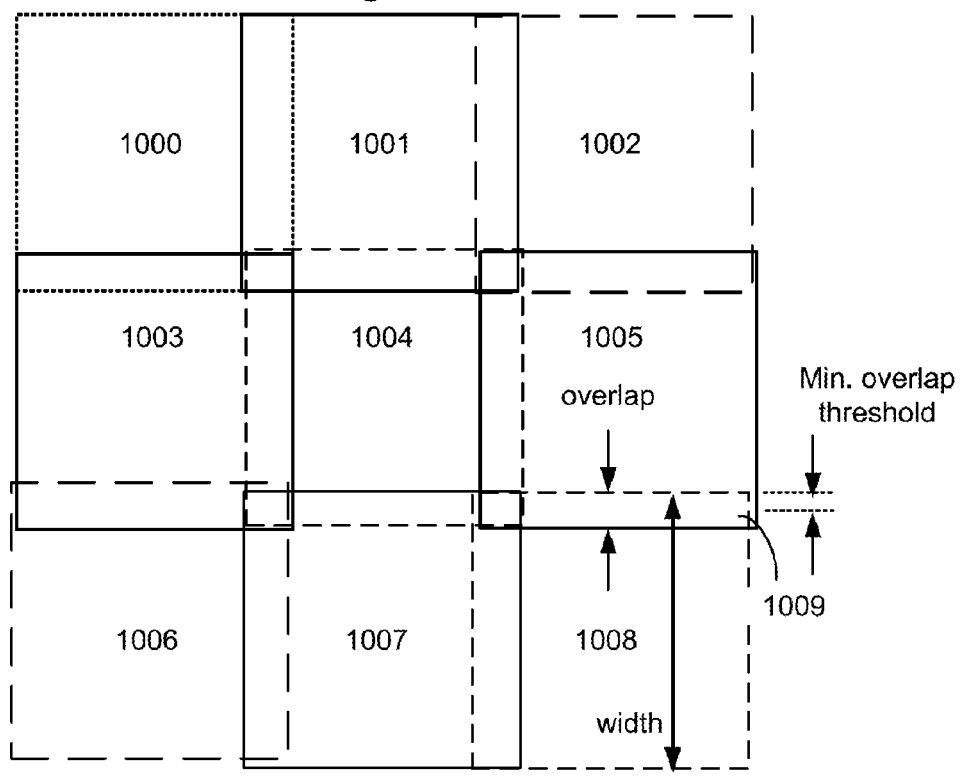
FIG. 10A depicts volumes which have an initial amount of overlap.

FIG. 10A depicts volumes which have an initial amount of overlap. Example volumes 1000-1008 are depicted in two dimensions as a simplification. Each volume encompasses a three-dimensional space. Volumes 1005 and 1008 overlap one another in an overlap region 1009. The degree of overlap can be represented as a fraction (e.g., percentage) of the width of a volume. Moreover, a minimum overlap threshold can be set as a specified fraction of the width of a volume. The width is the relevant dimension of a volume in the direction of overlap. In this case, the overlap exceeds the minimum threshold. This could occur when a new volume (e.g., volume 1005) is placed relative to a neighboring volume (e.g., volume 1008).

Figure 10B:
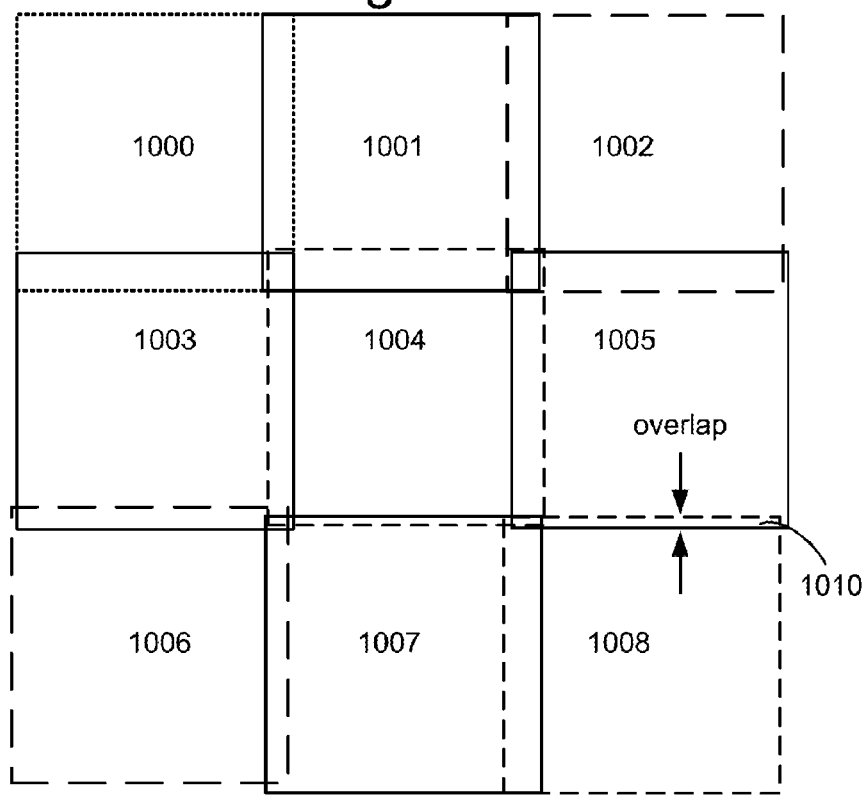
FIG. 10B depicts the volumes of FIG. 10A after their positions are adjusted based on an adjustment of a pose graph, resulting in a reduced amount of overlap.

FIG. 10B depicts the volumes of FIG. 10A after their positions are adjusted based on an adjustment of a pose graph, resulting in a reduced amount of overlap. In this case, the overlap area 1010 is less than the overlap region 1009 in FIG. 10A due to an adjustment of the positions of the volumes in the physical space. For example, the volume 1008 could move further away from the volume 1005 due to the adjustment. Advantageously, no gap has resulted, so that a reconstructed surface in these volumes will not have a gap.

In contrast, suppose we initially placed SR volumes to be perfectly aligned with each other, with no gap or overlap. Then, after pose adjustment, the SR volumes could have gaps between them. We therefore initially place SR volumes to have some moderate overlap. That way, when they move due to pose adjustment, there is less of a chance they will have gaps between them. Gaps are generally undesirable since they result in discontinuities in the reconstructed surfaces.

Figure 11A:
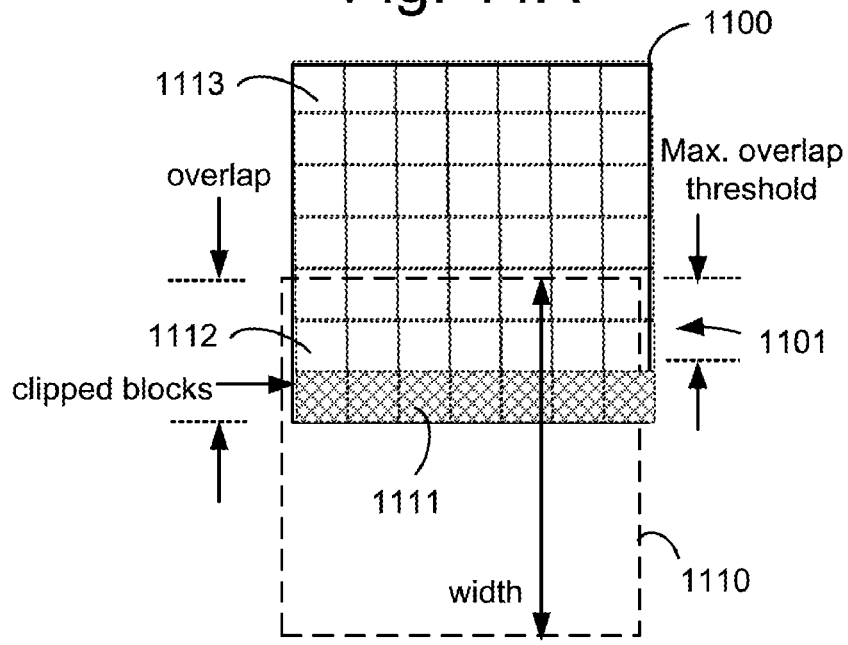
FIG. 11A depicts an example of clipping of blocks in a volume due to excessive overlap.

FIG. 11A depicts an example of clipping of blocks in a volume due to excessive overlap. A volume 1100 includes 7×7 blocks in this example. Each block is represented by a small square. The amount of overlap with a volume 1110 exceeds the maximum overlap threshold, indicating that clipping of blocks is desirable. A row of clipped blocks, including an example clipped block 1111, is depicted. Each clipped block has a cross-hatched pattern. Block 1112 is an example block in the volume 1100 in the overlap region 1101 which is not clipped. Block 1113 is an example block in the volume 1100 which is not in the overlap region 1101. A clipped block is an inactive block that is ignored during surface reconstructing to reduce processing and storage requirements.

Figure 11B:
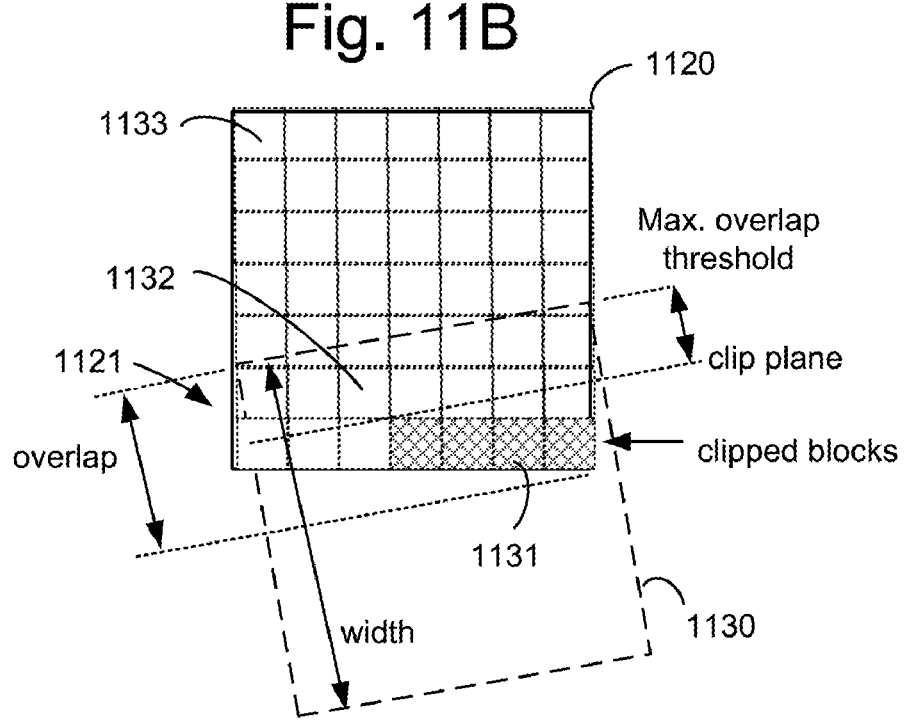
FIG. 11B depicts another example of clipping of blocks in a volume due to excessive overlap.

FIG. 11B depicts another example of clipping of blocks in a volume due to excessive overlap. Here, a volume 1120 is at an angle to a volume 1130, so that the overlap region 1121 is generally triangular. A clip plane is set such that there are four clipped blocks including an example clipped block 1131. Each clipped block has a cross-hatched pattern. Block 1132 is an example block in the volume 1120 in the overlap region 1121 which is not clipped. Block 1133 is an example block in the volume 1120 which is not in the overlap region 1121.

Clipping of blocks in a volume can be useful as a counterpart to providing overlap between volumes. As mentioned, pose adjustments cause SR volumes to move relative to each other. To pre-emptively avoid gaps, the SR service places volumes to have some overlap. But the overlap is at best redundant and at worst conflicting. The SR service deletes blocks that are entirely redundant, but this can still leave extraneous triangles or other shaped regions in those blocks which only partially overlap. Applications often want to omit the overlap regions. The SR utilities therefore can include a fast and efficient mesh clipping procedure to eliminate overlapping triangles. The clipping routine can provide the option to allow either a small overlap or a small gap. Both are useful. For example, a small overlap provides an easy and fast way to generate a mesh that appears to have no gaps. This is useful for occlusion rendering. On the other hand, a small gap facilitates zippering multiple separate meshes into a single contiguous mesh, which facilitates further mesh processing.

Figures 12A, 12B, 12C, 12D:
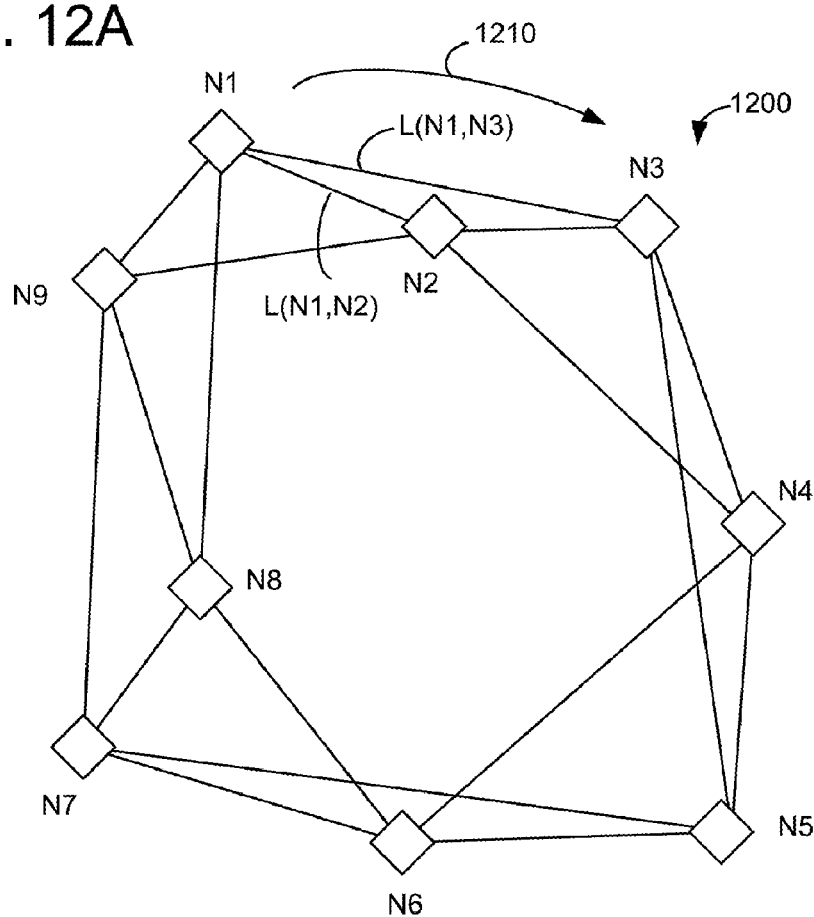
FIG. 12A depicts an example of a pose graph which represents poses of a rig in a physical space.
FIG. 12B depicts an example data record for an image captured by a camera.
FIG. 12C depicts an example data record for a depth map captured by a depth sensor.
FIG. 12D depicts an example data record of a pose graph.

FIG. 12A depicts an example of a pose graph 1200 which represents poses of a rig in a physical space. A pose graph includes nodes connected by links. A node comprises an image of a physical space as captured by a visible light camera, and an associated coordinate system. A link (e.g., edge) between two nodes comprises a correspondence between the images of the two nodes and a transform between the coordinate frames of the two nodes. The pose graph represents a path cycle of the rig. Arrow 1210 depicts a path of the rig. Examples nodes are N1-N9. Example links are a link L(N1,N2) which is between nodes N1 and N2 and a link L(N1,N3) which is between nodes N1 and N3.

In particular, a pose graph of a rig can be used to optimize the placement of volumes in a physical space for surface reconstruction. The problem of spatial partitioning is not specific to SR, and there are many spatial partitioning schemes. To understand why the techniques described herein work well for SR, first consider various aspects of how rig tracking works. The tracking and mapping subsystem 742 (FIG. 7) of a rig tracks the rig's trajectory through space and time by analyzing images (e.g., pictures) which are captured by the camera of the rig. Imagine the rig powers on for the first time and the camera captures images. The tracking and mapping subsystem extracts features from the images, estimates the locations of the features in the images and stores the features. The tracking and mapping subsystem also creates a coordinate system (e.g., a coordinate frame) it will use to measure positions and orientations. Both the images and the coordinate system are stored together with a node, in a map. Then the rig moves. The tracking and mapping subsystem takes more pictures and creates another coordinate frame, that the map associates with another node. The map service subsystem 741 recognizes that first and second images have some common features. The mapper uses computer vision algorithms and IMU data to estimate the relative poses between those two nodes.

The link between nodes represents two things: correspondences between images and a transform between the coordinate systems of the two nodes. However, when the mapper can obtain multiple estimates for the transform between nodes, those transforms can be inconsistent. The tracking and mapping system minimizes the inconsistency by adjusting the coordinate transforms and feature locations. This is called bundle adjustment. As the rig moves around, the mapper continues to add nodes and links, and this results in additional pose adjustments. As a result, the map of the physical space changes over time. That is, estimates of feature positions move and the pose graph is refined. For example, the links in the pose graph can change distance or orientation. SR should be robust against pose adjustments.

To understand how severe this problem can be and how far a feature in an image can appear to move, consider loop closure—an abrupt form of pose graph adjustment. Loop closure is a form of relocalization. For example, imagine the rig visits separate spaces without visiting the regions that connect them. The mapper will have separate map components for each space. Then, imagine the rig visits the regions between the spaces. The tracking and mapping subsystem will recognize that the regions are connected, and will add links to the pose graph. Relocalization refers to any topological change to the pose graph.

One form of loop closure occurs when the rigs ends up at a point in space where it already visited, and the tracking and mapping subsystem observes that fact. For example, imagine a user wearing an HMD device walks into a room such as in an art gallery and always faces the wall nearest to the user, beginning in a starting position. The user does not look across the room or behind the user. The user then circumnavigates the room, looking at each wall in turn, as the tracking and mapping subsystem creates new nodes. Just before the user returns to the starting position, the tracking and mapping subsystem does not yet recognize that it is at the starting point again. But, eventually, the tracking and mapping subsystem will recognize features captured while the user was at the starting point and will identify correspondences between images taken at the beginning and end of this loop. It will therefore create a new link in the pose graph, thus forming a closed loop. Just before loop closure, the transform between the start and end of the loop entails many hops. Just after loop closure, the transform between the start and end of the loop entails only a single hop. Each hop has some error, and the errors accumulate. The amount of accumulated errors is smaller just after loop closure. So, just before and just after loop closure, the transforms between nodes will abruptly change. The techniques provided herein allow the SR process to benefit from adjustments to the pose graph by anchoring volumes to the nodes and their coordinate systems in a pose graph. When the pose graph changes, the SR volumes come along for the ride since the volumes follow the pose graph node to which they are anchored.

FIG. 12B depicts an example data record for an image captured by a camera. Each image, or a set of images such as with video, can be stored in a data record, e.g., Image1. An orientation reading, e.g., OR1, of the rig can be associated with the image.

FIG. 12C depicts an example data record for a depth map captured by a depth sensor. Each depth map can be stored in a data record, e.g., DM1. An orientation reading, e.g., OR1, of the rig can be associated with the depth map.

FIG. 12D depicts an example data record of a pose graph. A record for a node may include a node identifier, e.g., N1, a camera image, e.g., Image1 and a coordinate system, e.g., CS1. A record for the link L(N1,N2) may include a link identifier, e.g., L(N1,N2), image correspondence data, e.g., C(N1,N2), and a transform between coordinate systems, e.g., T(N1,N2). A record for the link L(N1,N3) may include a link identifier, e.g., L(N1,N3), image correspondence data, e.g., C(N1,N3), and a transform between coordinate systems, e.g., T(N1,N3). A transform can be a matrix which relates one coordinate system as a matrix to another coordinate system as a matrix.

Figure 13A:
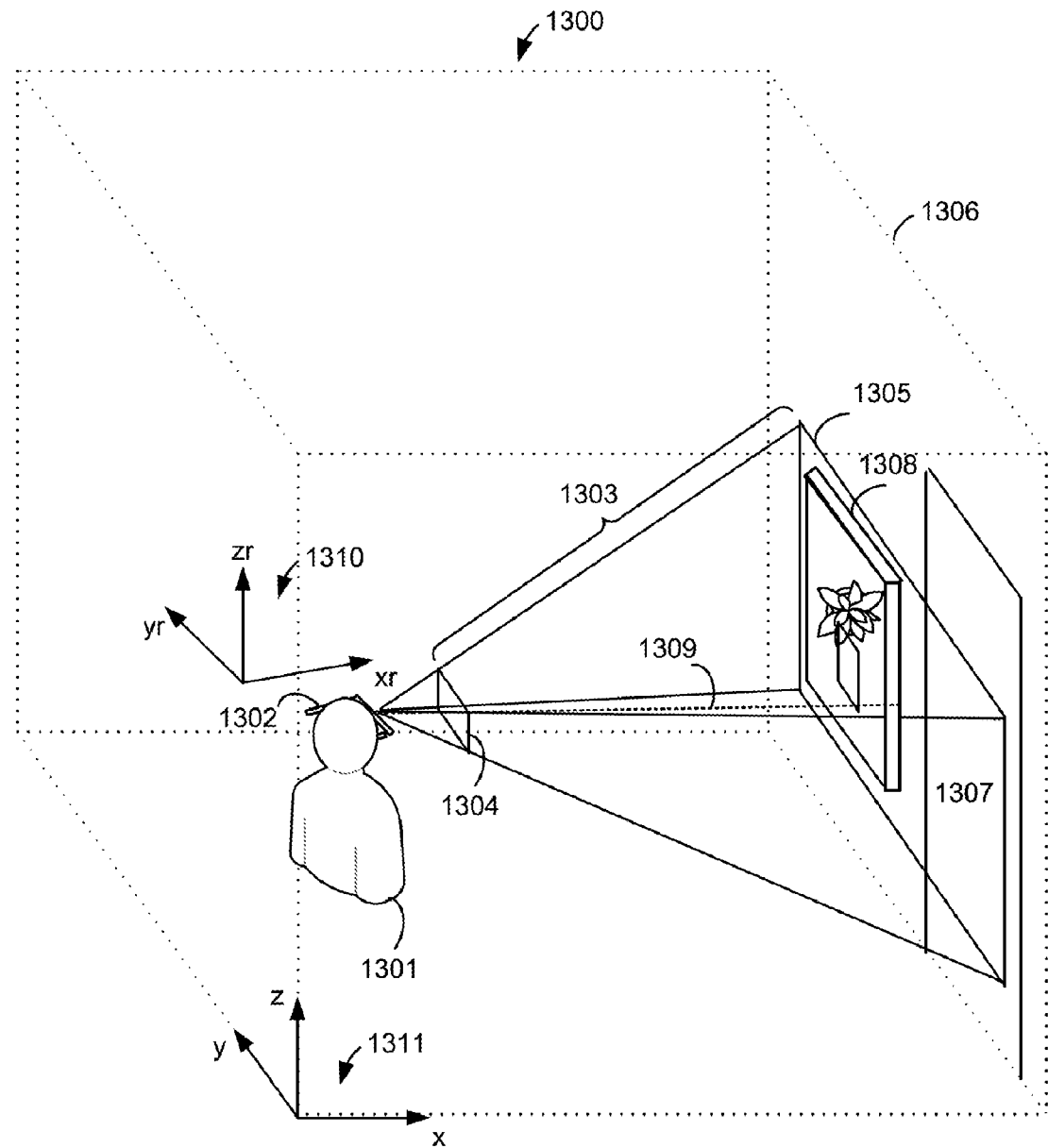
FIG. 13A depicts an example physical space, showing a frustum of a depth sensor.

FIG. 13A depicts an example physical space, showing a frustum of a depth sensor. A physical space 1300 is a room such as in the home of a user 1301 wearing an HMD device 1302 as an example of a rig. The depth sensor on the HMD device has a field of view which is represented by a frustum 1303 extending between a back plane 1304 and a front plane 1305 at a wall 1306 of the room. The wall includes a doorway 1307 and a decorative painting 1308. The painting is attached to the wall 1306 and has a noticeable depth. A line 1309 represents a central axis of the field of view of the depth sensor, e.g., the direction in which the depth sensor (and the user and the HMD device) is looking A Cartesian coordinate system 1310 with orthogonal axes of xr, yr and zr is an example coordinate system of the HMD device (r denotes the rig). For example, the xr axis can have the same direction as a vector (coincident with the line 1309) which represents the orientation of the rig. The yr axis can be defined to extend parallel to the ground. The zr axis is then orthogonal to the xr and yr axes. A Cartesian coordinate system 1311 of the physical space with orthogonal axes of x, y and z is also depicted. The depth sensor is at an origin of the coordinate system.

Figure 13B:
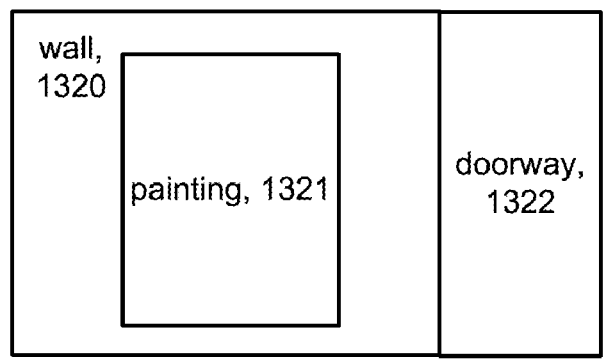
FIG. 13B depicts a depth map consistent with FIG. 13A.

FIG. 13B depicts a depth map 1315 consistent with FIG. 13A. The depth map includes a region 1320 for the wall 1306, a region 1321 for the painting 1308 and a region 1322 for the doorway 1307.

Figure 13C:
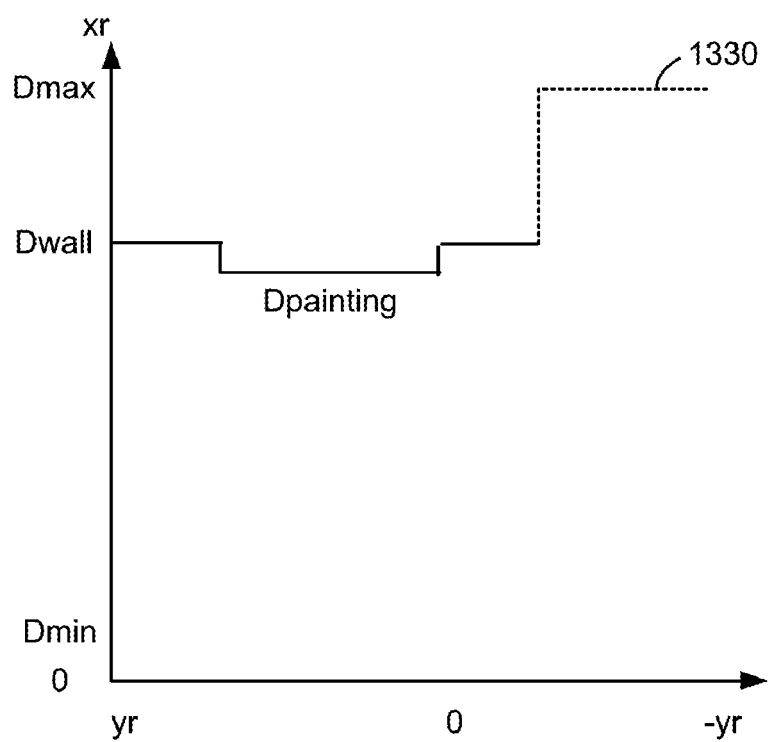
FIG. 13C depicts distance values of the depth map of FIG. 13B.

FIG. 13C depicts distance values of the depth map of FIG. 13B. The horizontal axis depicts a direction which is orthogonal to the center line 1309 of the depth sensor, such as a direction of the yr axis. The vertical axis depicts a distance of the object from the depth sensor, such as a distance along the xr axis. A line 1330 represents the depth. Portions of the line which correspond to a depth of the wall have a depth value of Dwall. A portion of the line which corresponds to a depth of the painting has a depth value of Dpainting. A portion of the line which corresponds to a depth of the doorway has a depth value of Dmax, a maximum depth which can be detected by the depth sensor. In this case, since the depth sensor looks through the doorway to a surface which is beyond the detection range, the depth value can be set to a maximum value. Dmin represents a minimum depth which can be detected by the depth sensor.

Figure 14A:
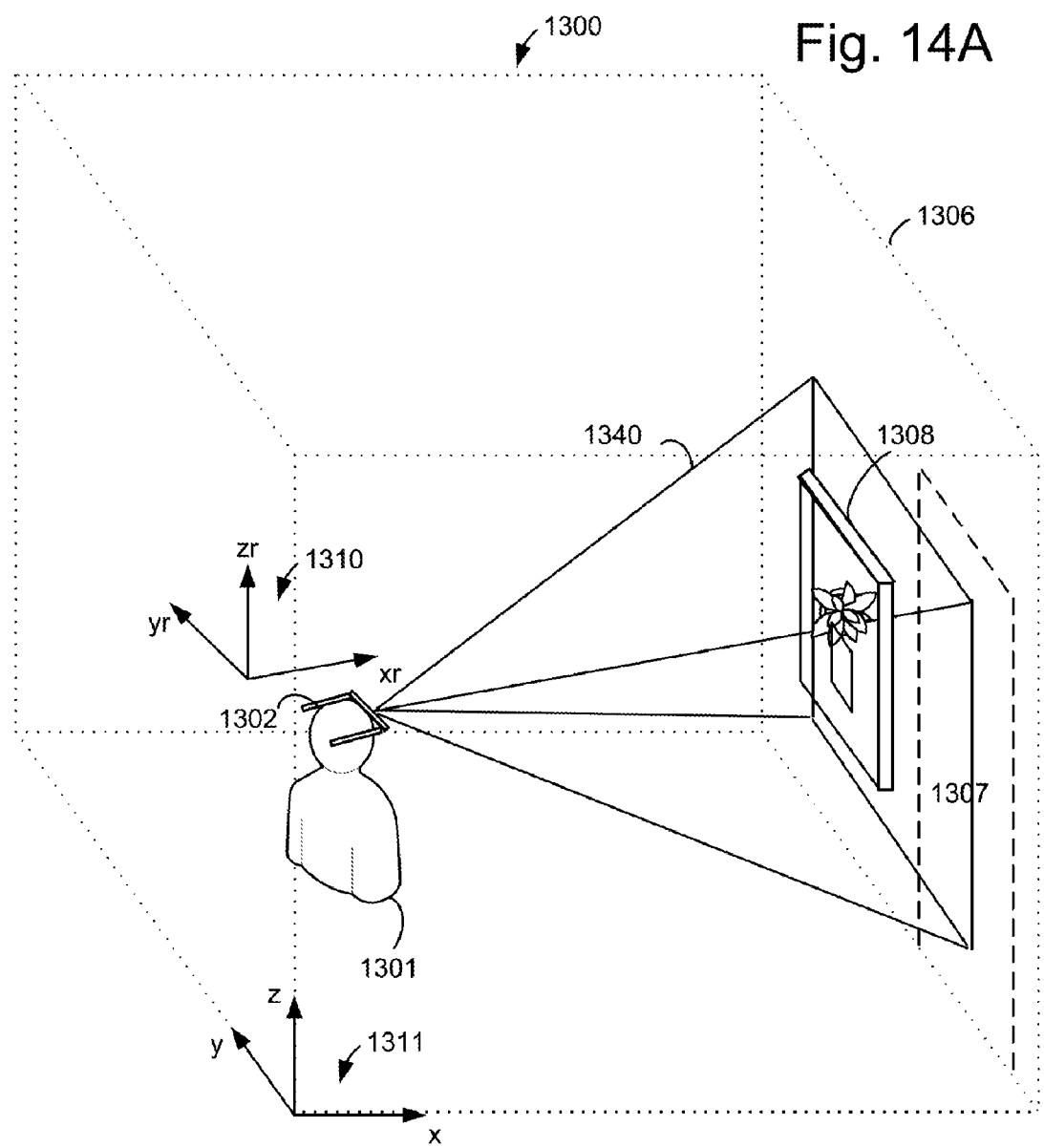
FIG. 14A depicts the example physical space of FIG. 13A, showing a field of view of a visible light camera.

FIG. 14A depicts the example physical space of FIG. 13A, showing a field of view of a visible light camera. Generally, a field of view 1340 of the camera can differ from the field of view of the depth sensor, although they can look in the same direction, e.g., the direction of the HMD device, and they can be substantially overlapping. In this example, the field of view 1340 of the camera is slightly narrower and taller than the field of view of the depth sensor. The coordinate system 1310 of the HMD device is the same as in FIG. 13A as an example but this is not required. The axis can be coincident with a center line of the camera which is the same as the center line 1309 of the depth sensor.

Figure 14B:
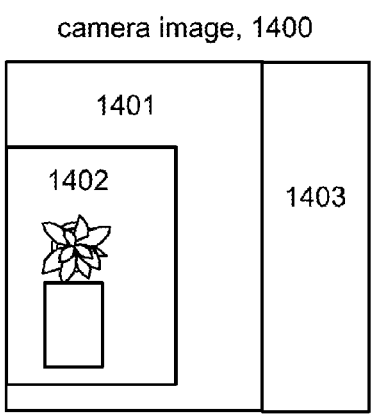
FIG. 14B depicts an image obtained by the visible light camera of FIG. 14A.

FIG. 14B depicts an image obtained by the visible light camera of FIG. 14A. The image 1400 includes a portion 1410 which represents the wall, a portion 1402 which represents the painting, and a portion 1403 which represents the doorway.

Figure 14C:
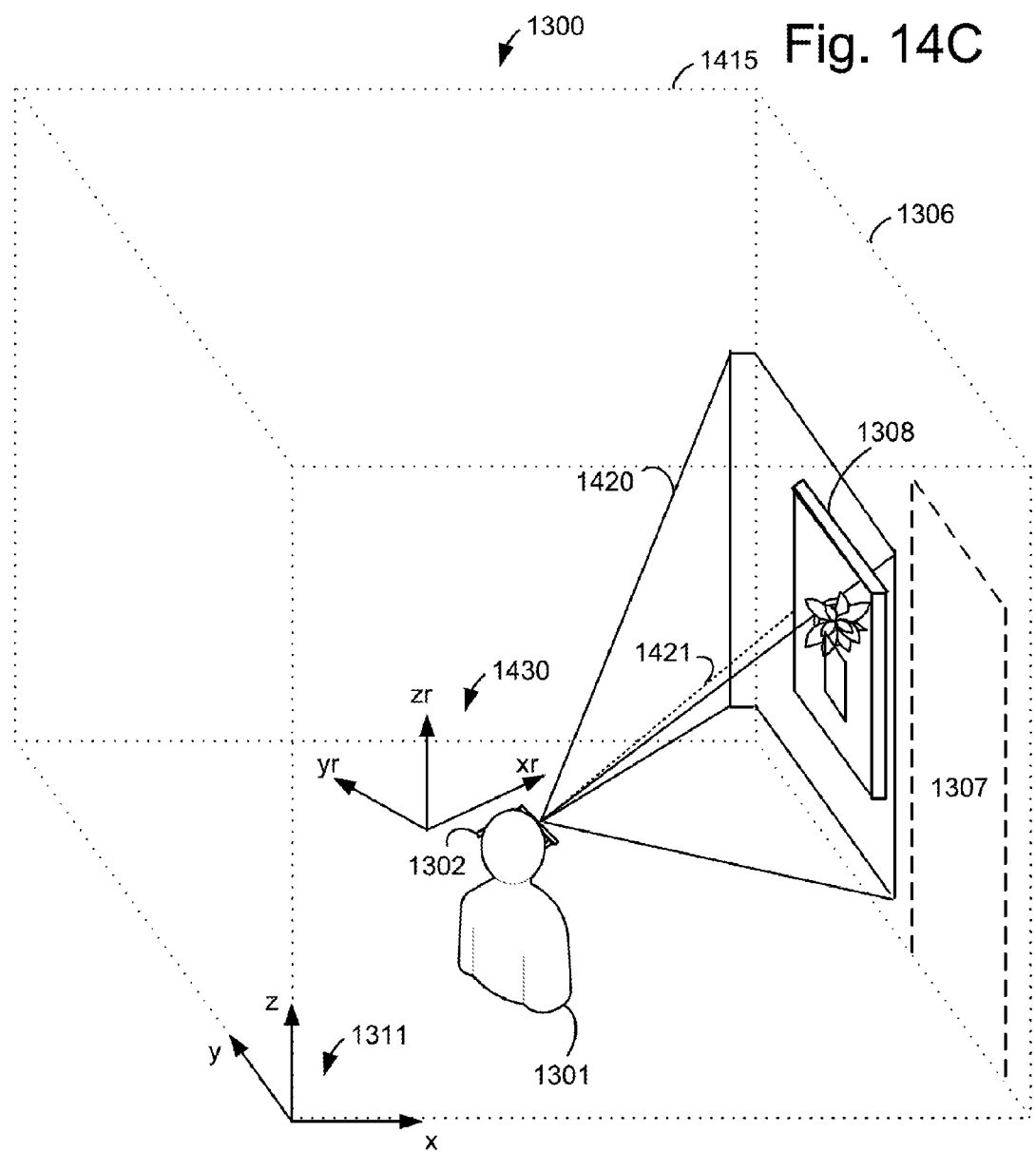
FIG. 14C depicts the example physical space of FIG. 13A, showing another field of view of the visible light camera as a pose of the HMD device is changed.

FIG. 14C depicts the example physical space of FIG. 13A, showing another field of view of the visible light camera as a pose of the HMD device is changed. In this case, the user has moved such that the camera on the HMD device captures a different image of the physical space. For example, the user may have rotated his head and/or walked around in the room. The field of view 1420 is defined relative to the coordinate system 1430 which differs from the coordinate system 1310 of FIG. 14A. In one approach, the xr axis is coincident with a center line 1421 of the camera.

Figure 14D:
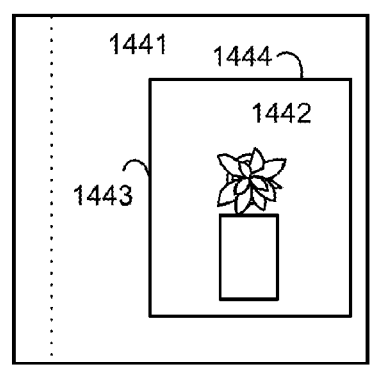
FIG. 14D depicts an image obtained by the visible light camera of FIG. 14C.

FIG. 14D depicts an image obtained by the visible light camera of FIG. 14C. The image 1440 includes a portion 1441 which represents the wall 1306 and the adjacent wall 1415, and a portion 1442 which represents the painting. As can be seen, the images 1400 and 1440 will have corresponding features such as the horizontal lines 1444 of the frame of painting, the vertical lines 1443 of the frame of the painting, and the colors and shapes of the flower and vase in the painting.

Figure 15A:
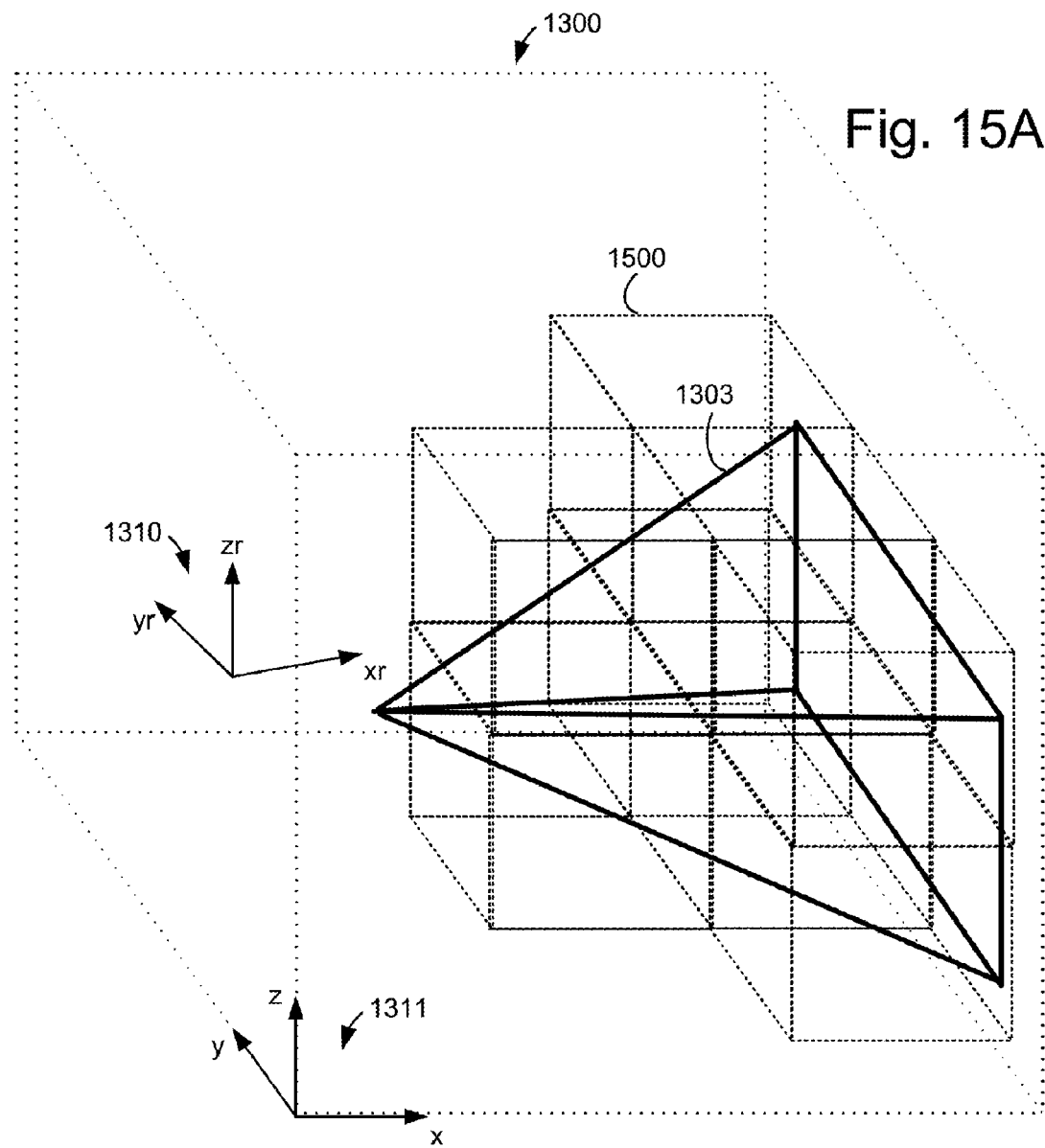
FIG. 15A depicts an initial placement of volumes in the physical space of FIG. 13A.

FIG. 15A depicts an initial placement of volumes in the physical space of FIG. 13A. The view frustum 1303 is depicted along with eight volumes (including example volume 1500) which are defined relative to the coordinate system 1310 and positioned to encompass the view frustum.

FIG. 15B depicts an adjusted placement of the volumes of FIG. 15A. In this simplified example, the volumes are adjusted similarly. However, in practice, each volume can be adjusted independently. Example volume 1500 is adjusted to provide example volume 1501. Moreover, the volume 1500 is defined with respect to one (e.g., initial) coordinate system 1310 (comprising axes xr, yr and zr), and the volume 1501 is defined with respect to an updated coordinate system 1510 (comprising axes xr', yr' and zr').

FIG. 16 depicts an example application in which a virtual object is placed in the physical space of FIG. 13A. The virtual object 1610 is a person which is visible to the user 1301 as an augmented reality image of the HMD device 1302. A field of view 1600 is associated with the augmented reality projection system of the HMD device. The virtual object can be placed in an appropriate location in the physical space 1300 since the surfaces in the room are known. For example, the virtual object can be placed a specified distance in front of the wall 1306 and to the side of the doorway 1307. Moreover, real-world objects which are behind the virtual object such as the painting 1308 can be occluded to provide greater realism. Note that different or common fields of view can be associated with the depth sensor, the camera and the augmented reality projection system. Further, while example implementations involving an HMD device have been described, the techniques provided herein are applicable to many other scenarios, including those involving robots and other types of rigs.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for reconstructing a physical space, comprising:
    obtaining a plurality of images of the physical space using a camera carried by a rig while the rig moves in the physical space through a plurality of poses;
    determining an orientation and a coordinate system of each pose;
    partitioning the physical space into a plurality of volumes;
    for each volume of the plurality of volumes, obtaining a depth map of the physical space using a depth sensor carried by the rig;
    providing a pose graph comprising a plurality of nodes and links between the nodes, each node being associated with one of the poses, one of the images associated with the one of the poses and one of the coordinate systems associated with the one of the poses, and the links defining correspondences between the images and transforms between the coordinate systems;
    for each volume, anchoring the volume to one of the nodes;
    updating a state of the pose graph as the plurality of images are obtained, the updating comprising updating one or more of the nodes and one or more of the links; and
    reconstructing a surface in one or more of the volumes according to the state of the pose graph.

2. The method of claim 1, further comprising:
    based on the updating of the state of the pose graph, re-anchoring one of the volumes to another of the nodes.

3. The method of claim 1, wherein:
    the updating of the state of the pose graph comprises updating one or more of the coordinate systems to provide one or more updated coordinate systems; and
    the reconstructing comprises projecting the one or more of the volumes into one or more of the depth maps using the one or more updated coordinate systems.

4. The method of claim 1, further comprising:
    dividing each of the one or more of the volumes into a plurality of blocks; and
    determining which of the blocks are in a view frustum of the depth sensor and which of the blocks are not in the view frustum of the depth sensor, the reconstructing comprises projecting the blocks which are in the view frustum but not the blocks which are not in the view frustum, into one or more of the depth maps.

5. The method of claim 1, wherein:
    the updating the state of the pose graph comprises performing a bundle adjustment in which the coordinate systems and the transforms are adjusted.

6. The method of claim 1, wherein:
    the updating of the state of the pose graph comprises updating one or more of the correspondences.

7. The method of claim 1, wherein:
    the updating of the state of the pose graph comprises performing a relocalization in which there is a change in topology in the pose graph.

8. The method of claim 7, wherein:
the relocalization comprises a loop closure, in which a closed loop of the nodes is formed in the pose graph.

9. The method of claim 1, wherein:
the volumes are defined to provide an amount of overlap at or above a minimum threshold among neighboring volumes of the plurality of volumes.

10. The method of claim 9, further comprising:
determining that the updating the state of the pose graph has increased the amount of overlap above a maximum threshold, for at least one of the volumes; and
reducing the amount of overlap by clipping the at least one of the volumes.

11. The method of claim 1, wherein:
the surface is used in at least one of placing a virtual object, defining a play space, path-finding, collision detection or occlusion of virtual objects, in the physical space.

12. An apparatus for reconstructing a physical space, comprising:
an orientation sensor;
a depth sensor;
a camera; and
a processor in communication with the orientation sensor, the depth sensor and the camera, the processor:
obtains a plurality of images of the physical space from the camera,
associates a pose and a coordinate system with each image based on the orientation sensor,
partitions the physical space into a plurality of volumes;
for each volume of the plurality of volumes, obtains a depth map of the physical space from the depth sensor,
provides a pose graph comprising a plurality of nodes and links between the nodes, each node being associated with one of the poses, one of the images associated with the one of the poses and one of the coordinate systems associated with the one of the poses, and the links define correspondences between the images and transforms between the coordinate systems;
for each volume, anchor the volume to one of the nodes;
update a state of the pose graph as the plurality of images are obtained; and
reconstructs a surface in one or more of the volumes according to the state of the pose graph.

13. The apparatus of claim 12, wherein:
the orientation sensor, the depth sensor, the camera and the processor are carried on a head mounted device or a mobile robot.

14. The apparatus of claim 12, wherein, the processor:
to update the state of the pose graph, updates one or more of the coordinate systems to provide one or more updated coordinate systems; and
to reconstruct the surface, projects the one or more of the volumes into one or more of the depth maps using the one or more updated coordinate systems.

15. The apparatus of claim 12, wherein:
the volumes are defined to provide an amount of overlap at or above a minimum threshold among neighboring volumes of the plurality of volumes; and
the update to the state of the pose graph reduces the amount of overlap, for at least one of the volumes.

16. A processor-readable storage device having processor-readable software embodied thereon for programming a processor to perform a method for reconstructing a physical space, the method comprising:
obtaining a plurality of images of the physical space using a camera carried by a rig while the rig moves in the physical space;
determining poses of the rig, each pose being associated with an orientation and a coordinate system;
providing a pose graph based on the poses and the images, the pose graph comprising a plurality of nodes and links between the nodes;
obtaining a depth map of a volume in the physical space using a depth sensor carried by the rig;
anchoring the volume to one of the nodes;
updating a state of the pose graph as the plurality of images are obtained, the updating comprises updating one of the coordinate systems which is associated with the one of the nodes; and
reconstructing a surface in the volume according to the state of the pose graph.

17. The processor-readable storage device of claim 16, wherein:
in the pose graph, each node is associated with one of the poses, one of the images associated with the one of the poses and one of the coordinate systems associated with the one of the poses, and the links define correspondences between the images and transforms between the coordinate systems; and
the updating comprising updating one or more of the nodes and one or more of the links.

18. The processor-readable storage device of claim 16, wherein:
the reconstructing is based on a position of the volume in the physical space;
the position of the volume in the physical space is defined with respect to the one of the coordinate systems; and
the position of the volume in the physical space changes when the one of the coordinate systems is updated.

19. The processor-readable storage device of claim 18, wherein:
the position of the volume in the physical space is based on a view frustum of the camera in the one of the coordinate systems.

20. The processor-readable storage device of claim 16, wherein:
the reconstructing comprises projecting the volume into the depth map using the one of the coordinate systems before the one of the coordinate systems is updated followed by projecting the volume into the depth map using the one of the coordinate systems after the one of the coordinate systems is updated.

* * * * *